US012641557B2

(12) United States Patent
Yang et al.

(10) Patent No.: US 12,641,557 B2
(45) Date of Patent: May 26, 2026

(54) BLUETOOTH-BASED TIME SYNCHRONIZATION METHOD, CONTROL DEVICE, AND STORAGE MEDIUM

(71) Applicant: Huawei Technologies Co., Ltd., Shenzhen (CN)

(72) Inventors: Sulin Yang, Dongguan (CN); Xiaofeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/254,057

(22) PCT Filed: Nov. 22, 2021

(86) PCT No.: PCT/CN2021/132132
§ 371 (c)(1),
(2) Date: May 23, 2023

(87) PCT Pub. No.: WO2022/111419
PCT Pub. Date: Jun. 2, 2022

(65) Prior Publication Data
US 2024/0107470 A1 Mar. 28, 2024

(30) Foreign Application Priority Data

Nov. 24, 2020 (CN) .......................... 202011331137.7

(51) Int. Cl.
*H04W 56/00* (2009.01)
*H04J 3/06* (2006.01)

(52) U.S. Cl.
CPC ....... *H04W 56/0015* (2013.01); *H04J 3/0638* (2013.01); *H04J 3/0682* (2013.01)

(58) Field of Classification Search
CPC ..... H04W 4/80; H04W 84/18; H04W 56/001; H04W 56/0015; H04J 3/0638; H04J 3/0641; H04J 3/0658; H04J 3/0661; H04J 3/067; H04J 3/0673; H04J 3/065; H04J 3/0664
See application file for complete search history.

(56) References Cited

U.S. PATENT DOCUMENTS

| | | | | |
|---|---|---|---|---|
| 9,288,777 | B2 * | 3/2016 | Hollabaugh | ...... H04W 56/0035 |
| 2008/0291891 | A1 * | 11/2008 | Jerlhagen | .............. H04W 28/02 370/350 |
| 2013/0223577 | A1 * | 8/2013 | Xu | ...................... H04L 27/2688 375/354 |

(Continued)

FOREIGN PATENT DOCUMENTS

| | | |
|---|---|---|
| CN | 104219744 A | 12/2014 |
| CN | 106028272 A | 10/2016 |

(Continued)

*Primary Examiner* — Peter Chen
(74) *Attorney, Agent, or Firm* — Conley Rose, P.C.

(57) ABSTRACT

A time synchronization method includes obtaining a first BLUETOOTH packet from a master device, where the first BLUETOOTH packet carries first time stamp information, and the first time stamp information indicates a sending moment $t_1$ that is of the first BLUETOOTH packet and that is determined based on a clock of the master device; and correcting a local time of a slave device based on the first time stamp information.

17 Claims, 12 Drawing Sheets

(56)                    References Cited

U.S. PATENT DOCUMENTS

| | | | | |
|---|---|---|---|---|
| 2014/0068315 | A1* | 3/2014 | Aweya | G06F 1/14 |
| | | | | 713/503 |
| 2015/0382304 | A1 | 12/2015 | Park | |
| 2018/0007523 | A1 | 1/2018 | Knaappila | |
| 2018/0220384 | A1* | 8/2018 | Kerai | H04W 56/001 |
| 2018/0324829 | A1 | 11/2018 | Van Driest et al. | |

FOREIGN PATENT DOCUMENTS

| | | | | |
|---|---|---|---|---|
| CN | 106130678 A | 11/2016 | | |
| CN | 106817671 A | 6/2017 | | |
| CN | 108108146 A | 6/2018 | | |
| CN | 108702715 A | 10/2018 | | |
| CN | 109345056 A | 2/2019 | | |
| CN | 110568753 A | 12/2019 | | |
| CN | 110784783 A | * 2/2020 | ......... H04Q 11/0062 | |
| EP | 3375227 A1 | 9/2018 | | |
| KR | 20180103849 A | 9/2018 | | |
| KR | 20190096140 A | 8/2019 | | |
| KR | 20190096143 A | 8/2019 | | |
| NO | 932828 L | 2/1994 | | |
| WO | 2017082719 A1 | 5/2017 | | |
| WO | 2017143936 A1 | 8/2017 | | |
| WO | 2020133183 A1 | 7/2020 | | |

* cited by examiner

A1    P1

A2    P2

BLUETOOTH-BASED TIME SYNCHRONIZATION METHOD, CONTROL DEVICE, AND STORAGE MEDIUM

CROSS-REFERENCE TO RELATED APPLICATIONS

This is a U.S. National Stage of International Patent Application No. PCT/CN2021/132132; filed on Nov. 22, 2021, which claims priority to Chinese Patent Application No. 202011331137.7 filed on Nov. 24, 2020 both of which are hereby incorporated by reference in their entireties.

TECHNICAL FIELD

The present invention relates to the field of time synchronization technologies, and in particular, to a time synchronization method, a control apparatus, a device, and a storage medium.

BACKGROUND

A motion characteristic is a main function of a smart wearable device. A current smart wearable device such as a smart watch, bracelet, ring, or headset may provide a basic motion feature such as step counting. Most of motions are motions performed by a plurality of parts of a body. However, a current wearable device supports only single-point motion detection and cannot provide motion posture assessment on the plurality of parts of the body in a motion state. When a user wears a plurality of smart wearable devices, only a detection result of each smart wearable device can be separately provided, lacking high-precision comprehensive motion posture and health assessment. To obtain information of the high-precision comprehensive motion posture and health assessment, it is necessary to perform multi-point synchronous detection by a plurality of sensors of the plurality of wearable devices, and precise time synchronization needs to be achieved between the plurality of sensors.

Currently, there is no time synchronization mechanism in the Bluetooth standard. In the conventional technology, a master device obtains network time reference (Network Time Reference, NTR) through an application layer, and sends, through a BLE data channel, the NTR to a slave device on which time synchronization needs to be performed. Alternatively, each device obtains a standard time, and adjusts a local time according to the standard time, to achieve time synchronization between a plurality of devices.

However, the foregoing solution in the conventional technology has the following disadvantages:

If time synchronization is performed by obtaining a network time, a network time entry needs to be added to a device that needs to obtain the network time. However, the network time is not necessary for most applications. In addition, time information transmitted through a data channel has poor time precision due to uncertainty of BLE scheduling and an unfixed transmission delay at a bottom layer, which cannot meet a millisecond-level high precision requirement.

SUMMARY

This application provides a time synchronization method, a control apparatus, a device, and a storage medium. In the time synchronization method, time stamp information may be added to a physical frame of a Bluetooth packet sent between a master device and a slave device, where the time stamp information is a sending moment of the Bluetooth packet, and the slave device corrects a local time of the slave device based on the time stamp information in the Bluetooth packet sent by the master device. When there is no need to obtain a network time, time synchronization between the master device and the slave device may be performed through a time stamp added to the Bluetooth packet between the master device and the slave device, and a problem in the conventional technology that a millisecond-level high precision requirement cannot be met is overcome by sending the Bluetooth packet. Therefore, in the time synchronization method, a smart wearable device is enabled to implement high-precision comprehensive motion posture and health assessment.

According to a first aspect, this application provides a time synchronization method. including:

A first electronic device obtains a first Bluetooth packet sent by a second electronic device, where the first Bluetooth packet carries first time stamp information, the first time stamp information indicates a sending moment $t_1$ of the first Bluetooth packet, and the first time stamp information is a field in a protocol data unit of a Bluetooth physical frame in the first Bluetooth packet.

The first electronic device corrects a local time of the first electronic device based on the first time stamp information.

The sending moment $t_1$ of the first Bluetooth packet is determined in the following manner:

obtaining, by the second electronic device, clock information of the second electronic device before sending the first Bluetooth packet to the first electronic device, and determining a pre-start sending moment of the first Bluetooth packet based on the clock information of the second electronic device; and determining, by the second electronic device, a sending moment of a first bit of an access address in the first Bluetooth packet based on the pre-start sending moment of the first Bluetooth packet, and using the determined sending moment of the first bit of the access address in the first Bluetooth packet as the sending moment $t_1$ of the first Bluetooth packet.

Further, the field includes a first field and a second field; and the first field and the second field are respectively a time stamp indication and a time stamp, the time stamp indication indicates that the Bluetooth physical frame carries the time stamp, and the time stamp includes the sending moment $t_1$.

Further, that a local time of the slave device is corrected based on the first time stamp information includes:

The sending moment $t_1$ is used as a current local time of the first electronic device.

Further, after the local time of the slave device is corrected based on the first time stamp information, the method further includes:

sending a second Bluetooth packet to the second electronic device, where the second Bluetooth packet carries second time stamp information, the second time stamp information indicates a sending moment $t_2$ of the second Bluetooth packet, and the sending moment $t_2$ of the second Bluetooth packet is a sending moment of a first bit of an access address in the second Bluetooth packet;

obtaining a third Bluetooth packet sent by the second electronic device, where the third Bluetooth packet carries third time stamp information, and the third time stamp information indicates an average unidirectional transmission delay between the second electronic device and the second electronic device; and correcting the local time of the first electronic device based on the average unidirectional transmission delay.

According to a second aspect, this application further provides a time synchronization method, including:

A first electronic device obtains a first Bluetooth packet sent by a second electronic device, where the first Bluetooth packet carries first time stamp information, the first time stamp information indicates a sending moment $t_1$ that is of the first Bluetooth packet and that is determined based on clock information of the second electronic device, and the first time stamp information is a field in a protocol data unit of a Bluetooth physical frame in the first Bluetooth packet.

The sending moment $t_1$ of the first Bluetooth packet is determined in the following manner:

obtaining, by the second electronic device, clock information of the second electronic device before sending the first Bluetooth packet to the first electronic device, and determining a pre-start sending moment of the first Bluetooth packet based on the clock information of the second electronic device; and determining, by the second electronic device, a sending moment of a first bit of an access address in the first Bluetooth packet based on the pre-start sending moment of the first Bluetooth packet, and using the determined sending moment of the first bit of the access address in the first Bluetooth packet as the sending moment $t_1$ of the first Bluetooth packet.

The first electronic device determines, based on a local clock, a receiving moment $t_4$ at which the first Bluetooth packet is received.

A fourth Bluetooth packet is sent to the second electronic device, where the fourth Bluetooth packet carries fourth time stamp information, the fourth time stamp information includes the receiving moment $t_4$ of the first Bluetooth packet and a sending moment $t_5$ of the fourth Bluetooth packet, and the sending moment $t_5$ is a sending moment of a first bit of an access address in the fourth Bluetooth packet.

The first electronic device obtains a fifth Bluetooth packet sent by the second electronic device, where the fifth Bluetooth packet carries fifth time stamp information, and the fifth time stamp information includes an average unidirectional transmission delay between the second electronic device and the first electronic device, a frequency offset time difference between the second electronic device and the first electronic device, and a receiving moment $t_6$ of the fourth Bluetooth packet.

The first electronic device corrects a local time of the first electronic device based on the average unidirectional transmission delay, the frequency offset time difference, and the receiving moment $t_6$ of the fourth Bluetooth packet.

According to a third aspect, this application further provides a time synchronization method, including:

A second electronic device obtains clock information of the second electronic device before sending a first Bluetooth packet to a first electronic device, and determines a pre-start sending moment of the first Bluetooth packet based on the clock information of the second electronic device.

The second electronic device determines a sending moment of a first bit of an access address in the first Bluetooth packet based on the pre-start sending moment of the first Bluetooth packet, and uses the determined sending moment of the first bit of the access address in the first Bluetooth packet as a sending moment $t_1$ of the first Bluetooth packet.

The second electronic device starts to send the first Bluetooth packet to the first electronic device at the pre-start sending moment of the first Bluetooth packet, where the first Bluetooth packet carries first time stamp information, the first time stamp information indicates the sending moment $t_1$ of the first Bluetooth packet, and the first time stamp information is a field in a protocol data unit of a Bluetooth physical frame in the first Bluetooth packet.

Further, the field includes a first field and a second field; and the first field and the second field are respectively a time stamp indication and a time stamp, the time stamp indication indicates that the Bluetooth physical frame carries the time stamp, and the time stamp includes the sending moment $t_1$ of the first Bluetooth packet.

Further, after the second electronic device starts to send the first Bluetooth packet to the first electronic device at the pre-start sending moment of the first Bluetooth packet, the method further includes:

The second electronic device obtains a second Bluetooth packet sent by the first electronic device, where the second Bluetooth packet carries second time stamp information, and the second time stamp information indicates a sending moment $t_2$ of the second Bluetooth packet.

The second electronic device determines, based on the clock information of the second electronic device, a receiving moment $t_3$ at which the second Bluetooth packet is received, and calculates an average unidirectional transmission delay between the second electronic device and the first electronic device based on the sending moment $t_1$ of the first Bluetooth packet, the sending moment $t_2$ of the second Bluetooth packet, and the receiving moment $t_3$ of the second Bluetooth packet.

The second electronic device sends a third Bluetooth packet to the first electronic device, where the third Bluetooth packet carries third time stamp information, and the third time stamp information indicates the average unidirectional transmission delay between the second electronic device and the first electronic device.

Further, that an average unidirectional transmission delay between the second electronic device and the first electronic device is calculated based on the sending moment $t_1$ of the first Bluetooth packet, the sending moment $t_2$ of the second Bluetooth packet, and the receiving moment $t_3$ of the second Bluetooth packet includes calculating the average unidirectional transmission delay by using the following formula:

$$T_1 = \frac{t_3 - t_1 - (t_2 - t_1)}{2}$$

$T_1$ represents the average unidirectional transmission delay between the second electronic device and the first electronic device.

According to a fourth aspect, this application further provides a time synchronization method, including:

A second electronic device obtains clock information of the second electronic device before sending a first Bluetooth packet to a first electronic device, and determines a pre-start sending moment of the first Bluetooth packet based on the clock information of the second electronic device.

The second electronic device determines a sending moment of a first bit of an access address in the first Bluetooth packet based on the pre-start sending moment of the first Bluetooth packet, and uses the determined sending moment of the first bit of the access address in the first Bluetooth packet as a sending moment $t_1$ of the first Bluetooth packet.

The second electronic device starts to send the first Bluetooth packet to the first electronic device at the pre-start sending moment of the first Bluetooth packet, where the first Bluetooth packet carries first time stamp information, the first time stamp information indicates the sending moment $t_1$ of the first Bluetooth packet, and the first time stamp information is a field in a protocol data unit of a Bluetooth physical frame in the first Bluetooth packet.

The second electronic device obtains a fourth Bluetooth packet sent by the first electronic device, where the fourth Bluetooth packet carries fourth time stamp information, the fourth Bluetooth packet carries the fourth time stamp information, and the fourth time stamp information includes a receiving moment $t_4$ of the first Bluetooth packet and a sending moment $t_5$ of the fourth Bluetooth packet.

The second electronic device determines, based on the clock information of the second electronic device, a receiving moment $t_6$ at which the fourth Bluetooth packet is received, and calculates an average unidirectional transmission delay between the second electronic device and the first electronic device and a frequency offset time difference between the second electronic device and the first electronic device based on the sending moment $t_1$ of the first Bluetooth packet, the receiving moment $t_4$ of the first Bluetooth packet, the sending moment $t_5$ of the fourth Bluetooth packet, and the receiving moment $t_6$ of the fourth Bluetooth packet, where the frequency offset time difference is a time deviation caused by a frequency deviation between clocks.

The second electronic device sends a fifth Bluetooth packet to the first electronic device, where the fifth Bluetooth packet carries fifth time stamp information, and the fifth time stamp information includes the average unidirectional transmission delay between the first electronic device and the second electronic device, the frequency offset time difference between the second electronic device and the first electronic device, and the receiving moment $t_6$ of the fourth Bluetooth packet.

Further, that an average unidirectional transmission delay between the second electronic device and the first electronic device and a frequency offset time difference between the second electronic device and the first electronic device are calculated based on the sending moment $t_1$, the receiving moment $t_4$, the sending moment $t_5$, and the receiving moment $t_6$ includes calculating the average unidirectional transmission delay and the frequency offset time difference by using the following formulas:

$$T_2 = \frac{[(t_6 - t_5) + (t_4 - t_1)]}{2}$$

$T_2$ represents the average unidirectional transmission delay between the second electronic device and the first electronic device.

$$T_3 = \frac{[(t_6 - t_5) - (t_4 - t_1)]}{2}$$

$T_3$ represents the frequency offset time difference between the second electronic device and the first electronic device.

According to a fifth aspect, this application provides an electronic device, including:

a processor and a memory, where the memory is configured to store at least one piece of instruction, and when the instruction is loaded and executed by the processor, any one of the following methods is implemented:

the time synchronization method provided in the first aspect;

the time synchronization method provided in the second aspect;

the time synchronization method provided in the third aspect; or the time synchronization method provided in the fourth aspect.

According to a sixth aspect, this application provides a computer-readable storage medium, where the computer-readable storage medium stores a computer program, and when the computer program runs on a computer, the computer is enabled to perform any one of the following methods:

the time synchronization method provided in the first aspect;

the time synchronization method provided in the second aspect;

the time synchronization method provided in the third aspect; or the time synchronization method provided in the fourth aspect.

In a possible design, all or some of programs in the sixth aspect may be stored in a storage medium encapsulated in a processor, or some or all of the programs may be stored in a memory that is not encapsulated in a processor.

According to the foregoing technical solutions, when receiving a Bluetooth packet that carries time stamp information and that is sent by the master device, the slave device may correct a local time of the slave device based on the time stamp information that is carried in the Bluetooth packet and that is sent by the master device. When there is no need to obtain a network time, time synchronization between the master device and the slave device is performed through a time stamp added to the Bluetooth packet between the master device and the slave device, and a problem in the conventional technology that a millisecond-level high precision requirement cannot be met is overcome by sending the Bluetooth packet. Therefore, in the time synchronization method, a smart wearable device is enabled to implement high-precision comprehensive motion posture and health assessment.

In the foregoing technical solution, delay information between the first electronic device and the second electronic device is calculated on a side of the second electronic device. In another implementation, the delay information between the first electronic device and the second electronic device may further be calculated on a side of the first electronic device, which is specifically as follows:

According to a seventh aspect, this application further provides a time synchronization method, including:

A first electronic device obtains a first Bluetooth packet sent by a second electronic device, where the first Bluetooth packet carries first time stamp information, the first time stamp information indicates a sending moment $t_1$ of the first Bluetooth packet, and the first time stamp information is a field in a protocol data unit of a Bluetooth physical frame in the first Bluetooth packet.

The sending moment $t_1$ of the first Bluetooth packet is determined in the following manner:

obtaining, by the second electronic device, clock information of the second electronic device before sending the first Bluetooth packet to the first electronic device, and determining a pre-start sending moment of the first Bluetooth packet based on the clock information of the second electronic device; and determining, by the second electronic device, a sending moment of a first bit of an access address in the first Bluetooth packet based on the pre-start sending moment of the first Bluetooth packet, and using the determined sending moment of the first bit of the access address in the first Bluetooth packet as the sending moment $t_1$ of the first Bluetooth packet.

The first electronic device corrects a local time of the first electronic device based on the first time stamp information.

The first electronic device sends a second Bluetooth packet to the second electronic device, where the second Bluetooth packet carries second time stamp information, the second time stamp information indicates a sending moment $t_2$ of the second Bluetooth packet, and the sending moment $t_2$ of the second Bluetooth packet is a sending moment of a first bit of an access address in the second Bluetooth packet.

The first electronic device obtains a sixth Bluetooth packet sent by the second electronic device, where the sixth Bluetooth packet carries sixth time stamp information, the sixth time stamp information indicates a receiving moment $t_1$ of the second Bluetooth packet, and the receiving moment $t_3$ of the second Bluetooth packet is a receiving moment $t_3$ at which the second Bluetooth packet is received and that is determined by the second electronic device based on the clock information of the second electronic device.

The first electronic device calculates an average unidirectional transmission delay between the second electronic device and the first electronic device based on the sending moment $t_1$ of the first Bluetooth packet, the sending moment $t_2$ of the second Bluetooth packet, and the receiving moment $t_3$ of the second Bluetooth packet.

The local time of the first electronic device is corrected based on the average unidirectional transmission delay.

Further, that an average unidirectional transmission delay between the second electronic device and the first electronic device is calculated based on the sending moment $t_1$ of the first Bluetooth packet, the sending moment $t_2$ of the second Bluetooth packet, and the receiving moment $t_3$ of the second Bluetooth packet includes calculating the average unidirectional transmission delay by using the following formula:

$$T_1 = \frac{t_3 - t_1 - (t_2 - t_1)}{2}$$

$T_1$ represents the average unidirectional transmission delay between the second electronic device and the first electronic device.

According to an eighth aspect, this application further provides a time synchronization method, including:

A first electronic device obtains a first Bluetooth packet sent by a second electronic device, where the first Bluetooth packet carries first time stamp information, the first time stamp information indicates a sending moment $t_1$ that is of the first Bluetooth packet and that is determined based on clock information of the second electronic device, and the first time stamp information is a field in a protocol data unit of a Bluetooth physical frame in the first Bluetooth packet.

The sending moment $t_1$ of the first Bluetooth packet is determined in the following manner:

obtaining, by the second electronic device, clock information of the second electronic device before sending the first Bluetooth packet to the first electronic device, and determining a pre-start sending moment of the first Bluetooth packet based on the clock information of the second electronic device; and determining, the second electronic device, a sending moment of a first bit of an access address in the first Bluetooth packet based on the pre-start sending moment of the first Bluetooth packet, and using the determined sending moment of the first bit of the access address in the first Bluetooth packet as the sending moment $t_1$ of the first Bluetooth packet.

The first electronic device determines, based on a local clock, a receiving moment to at which the first Bluetooth packet is received.

The first electronic device sends a fourth Bluetooth packet to the second electronic device, where the fourth Bluetooth packet carries fourth time stamp information, the fourth time stamp information includes the receiving moment $t_4$ of the first Bluetooth packet and a sending moment $t_5$ of the fourth Bluetooth packet, and the sending moment $t_5$ is a sending moment of a first bit of an access address in the fourth Bluetooth packet.

The first electronic device obtains a seventh Bluetooth packet sent by the second electronic device, where the seventh Bluetooth packet carries seventh time stamp information, the seventh time stamp information indicates a receiving moment $t_6$ of the fourth Bluetooth packet, and the receiving moment $t_6$ of the fourth Bluetooth packet is a receiving moment $t_6$ at which the second Bluetooth packet is received and that is determined by the second electronic device based on the clock information of the second electronic device.

The first electronic device calculates an average unidirectional transmission delay between the second electronic device and the first electronic device and a frequency offset time difference between the second electronic device and the first electronic device based on the sending moment $t_1$ of the first Bluetooth packet, the receiving moment $t_4$ of the first Bluetooth packet, the sending moment $t_5$ of the fourth Bluetooth packet, and the receiving moment $t_6$ of the fourth Bluetooth packet, where the frequency offset time difference is a time deviation caused by a frequency deviation between clocks.

The first electronic device corrects a local time of the first electronic device based on the average unidirectional transmission delay, the frequency offset time difference, and the receiving moment $t_6$ of the fourth Bluetooth packet.

Further, that an average unidirectional transmission delay between the second electronic device and the first electronic device and a frequency offset time difference between the second electronic device and the first electronic device are calculated based on the sending moment $t_1$, the receiving moment $t_4$, the sending moment $t_5$, and the receiving moment $t_6$ includes calculating the average unidirectional transmission delay and the frequency offset time difference by using the following formulas:

$$T_2 = \frac{[(t_6 - t_5) + (t_4 - t_1)]}{2}$$

$T_2$ represents the average unidirectional transmission delay between the second electronic device and the first electronic device.

$$T_3 = \frac{[(t_6 - t_5) - (t_4 - t_1)]}{2}$$

$T_3$ represents the frequency offset time difference between the second electronic device and the first electronic device.

According to a ninth aspect, this application further provides a time synchronization method, including:

A second electronic device obtains clock information of the second electronic device before sending a first Bluetooth packet to a first electronic device, and determines a pre-start sending moment of the first Bluetooth packet based on the clock information of the second electronic device.

The second electronic device determines a sending moment of a first bit of an access address in the first Bluetooth packet based on the pre-start sending moment of the first Bluetooth packet, and uses the determined sending moment of the first bit of the access address in the first Bluetooth packet as a sending moment $t_1$ of the first Bluetooth packet.

The second electronic device starts to send the first Bluetooth packet to the first electronic device at the pre-start sending moment of the first Bluetooth packet, where the first Bluetooth packet carries first time stamp information, the first time stamp information indicates the sending moment $t_1$ of the first Bluetooth packet, and the first time stamp information is a field in a protocol data unit of a Bluetooth physical frame in the first Bluetooth packet.

The second electronic device obtains a second Bluetooth packet sent by the first electronic device, where the second Bluetooth packet carries second time stamp information, and the second time stamp information indicates a sending moment $t_2$ of the second Bluetooth packet.

The second electronic device determines, based on the clock information of the second electronic device, a receiving moment $t_3$ at which the second Bluetooth packet is received.

The second electronic device sends a sixth Bluetooth packet to the first electronic device, where the sixth Bluetooth packet carries sixth time stamp information, and the sixth time stamp information indicates the receiving moment $t_3$ of the second Bluetooth packet.

According to a tenth aspect, this application further provides a time synchronization method, including:

A second electronic device obtains clock information of the second electronic device before sending a first Bluetooth packet to a first electronic device, and determines a pre-start sending moment of the first Bluetooth packet based on the clock information of the second electronic device.

The second electronic device determines a sending moment of a first bit of an access address in the first Bluetooth packet based on the pre-start sending moment of the first Bluetooth packet, and uses the determined sending moment of the first bit of the access address in the first Bluetooth packet as the sending moment $t_1$ of the first Bluetooth packet.

The second electronic device starts to send the first Bluetooth packet to the first electronic device at the pre-start sending moment of the first Bluetooth packet, where the first Bluetooth packet carries first time stamp information, the first time stamp information indicates the sending moment $t_1$ of the first Bluetooth packet, and the first time stamp information is a field in a protocol data unit of a Bluetooth physical frame in the first Bluetooth packet.

The second electronic device obtains a fourth Bluetooth packet sent by the first electronic device, where the fourth Bluetooth packet carries fourth time stamp information, the fourth Bluetooth packet carries the fourth time stamp information, and the fourth time stamp information includes a receiving moment $t_4$ of the first Bluetooth packet and a sending moment $t_5$ of the fourth Bluetooth packet.

The second electronic device determines, based on the clock information of the second electronic device, a receiving moment $t_6$ at which the fourth Bluetooth packet is received.

The second electronic device sends a seventh Bluetooth packet to the first electronic device, where the seventh Bluetooth packet carries seventh time stamp information, and the seventh time stamp information indicates the receiving moment $t_6$ of the fourth Bluetooth packet.

According to an eleventh aspect, this application further provides an electronic device, including:

a processor and a memory, where the memory is configured to store at least one piece of instruction, and when the instruction is loaded and executed by the processor, any one of the following methods is implemented:

the time synchronization method provided in the seventh aspect;

the time synchronization method provided in the eighth aspect;

the time synchronization method provided in the ninth aspect; or the time synchronization method provided in the tenth aspect.

According to a twelfth aspect, this application further provides a computer-readable storage medium, where the computer-readable storage medium stores a computer program, and when the computer program is executed by a processor, any one of the following methods is implemented:

the time synchronization method provided in the seventh aspect;

the time synchronization method provided in the eighth aspect;

the time synchronization method provided in the ninth aspect; or the time synchronization method provided in the tenth aspect.

In a possible design, all or some of the programs in the twelfth aspect may be stored in a storage medium encapsulated in a processor, or some or all of the programs may be stored in a memory that is not encapsulated in a processor.

According to the foregoing technical solutions, when receiving a Bluetooth packet that carries time stamp information and that is sent by the master device, the slave device may correct a local time of the slave device based on the time stamp information that is carried in the Bluetooth packet and that is sent by the master device. When there is no need to obtain a network time, time synchronization between the master device and the slave device is performed through a time stamp added to the Bluetooth packet between the master device and the slave device, and a problem in the conventional technology that a millisecond-level high precision requirement cannot be met is overcome by sending the Bluetooth packet. Therefore, in the time synchronization method, a smart wearable device is enabled to implement high-precision comprehensive motion posture and health assessment.

BRIEF DESCRIPTION OF DRAWINGS

To describe the technical solutions in this application or the conventional technology more clearly, the accompanying drawings used for describing the embodiments or the conventional technology are briefly described below. It is cleared that, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of this application clearer, the following clearly and completely describes the technical solutions in this application with reference to the accompanying drawings in this application. It is clear that, the described embodiments are merely some rather than all of embodiments of the present invention. All other embodiments obtained by a person of ordinary skill in the art based on embodiments of the present invention without creative efforts shall fall within the protection scope of the present invention.

A time synchronization method provided in embodiments of this application may be applied to an electronic device. The electronic device may be a device such as a smart phone, a tablet computer, a wearable device, or an augmented reality (augmented reality. AR)/virtual reality (virtual reality, VR) device. A specific type of the electronic device is not limited in embodiments of this application.

Figure 1:
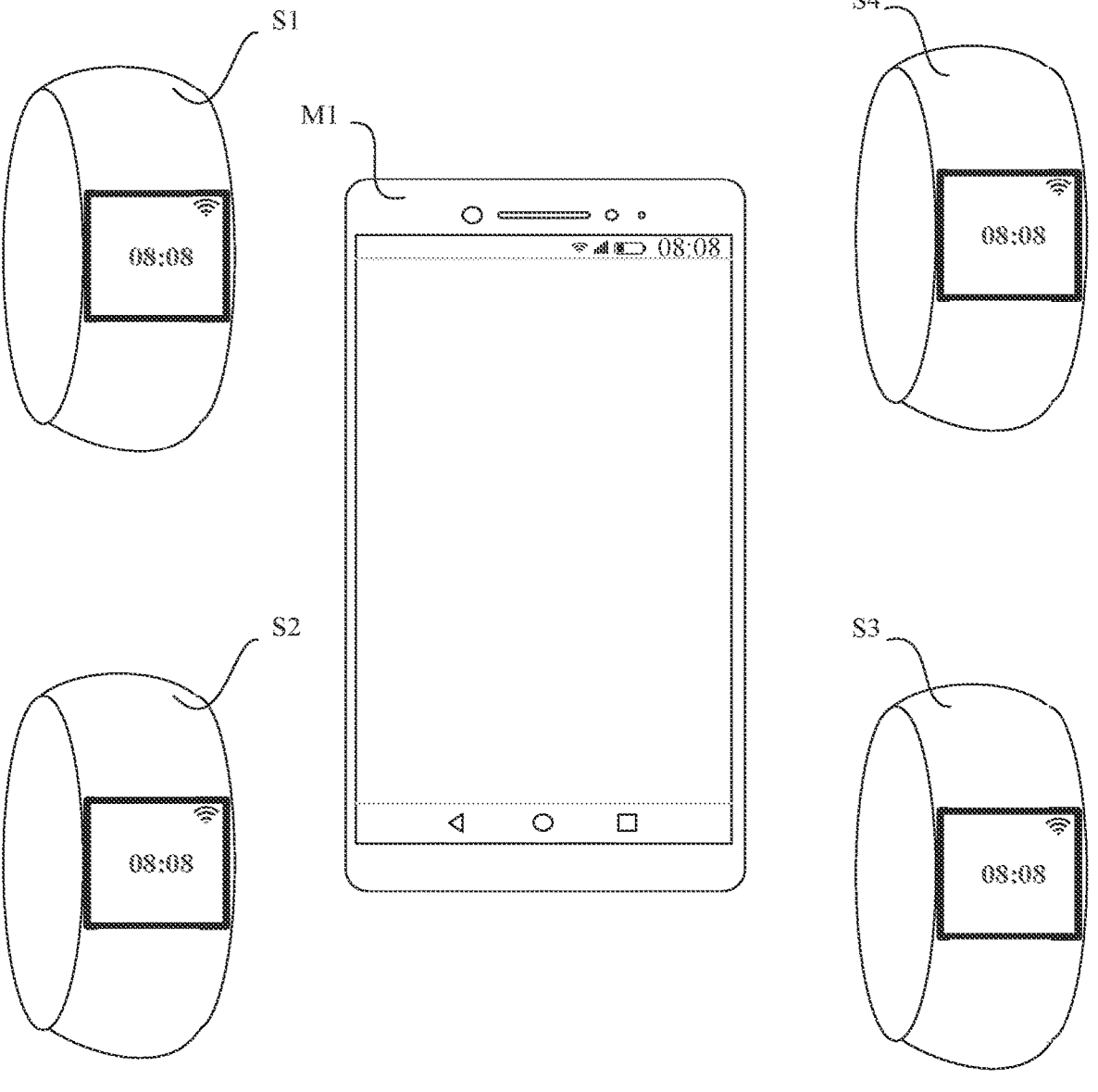
FIG. 1 is a schematic diagram of an application scenario according to this application.

FIG. 1 is a schematic diagram of an application scenario according to this application. As shown in FIG. 1, the time synchronization method provided in this application is applied to a scenario including a master device and a slave device. The master device may be a second electronic device M1, the slave device may be a first electronic device S1, and the scenario may include a plurality of slave devices. For example, the master device is a smart phone M1, and the slave devices are smart wearable devices S1 to S4. A plurality of smart wearable devices are respectively worn on different parts of a user, and perform motion posture assessment on corresponding parts when the user is doing sports. It is to be noted that, FIG. 1 is an example, and a quantity of slave devices is not limited herein. In a common sports scene (for example, running or cycling) or a high-speed sports scene (for example, playing badminton or doing extreme sports), the user has a relatively high-precision time synchronization standard for time synchronization between a plurality of sensors of a plurality of smart wearable devices. For example, a time synchronization requirement is less than 100 μs or even less than 10 μs. Time synchronization between the master device and the slave device is performed by using the time synchronization method provided in this application. The master device is a central device in this scenario, and a local time of the master device is used as a standard time for time synchronization between the master device and the slave device. The master device sends a Bluetooth packet to the slave device, and carries the local time of the master device in the Bluetooth packet as a time stamp. The slave device performs a time synchronization operation based on time information indicated by the time stamp carried in the received Bluetooth packet.

In the time synchronization method provided in this application, time synchronization information (time stamp information) is carried in a Bluetooth packet, and the master device sends the Bluetooth packet carrying the time stamp information to the slave device, where the time stamp information indicates a sending moment that is of the Bluetooth packet and that is determined based on a clock of the master device.

Figure 2:
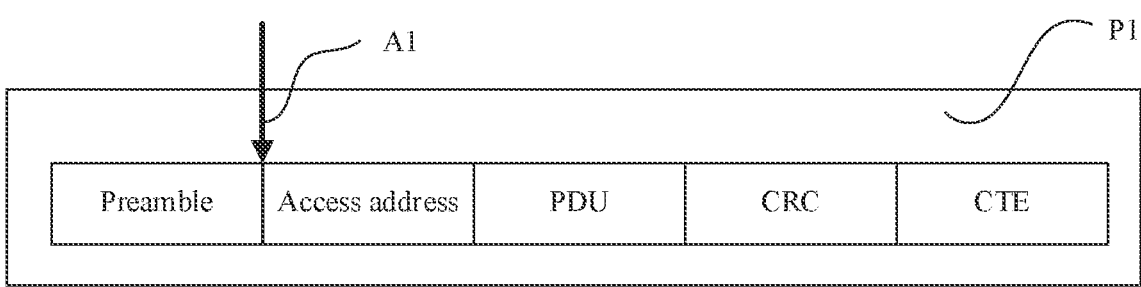
FIG. 2 is a schematic diagram of a reference location at a packet transmission moment according to this application.
Figure 2:
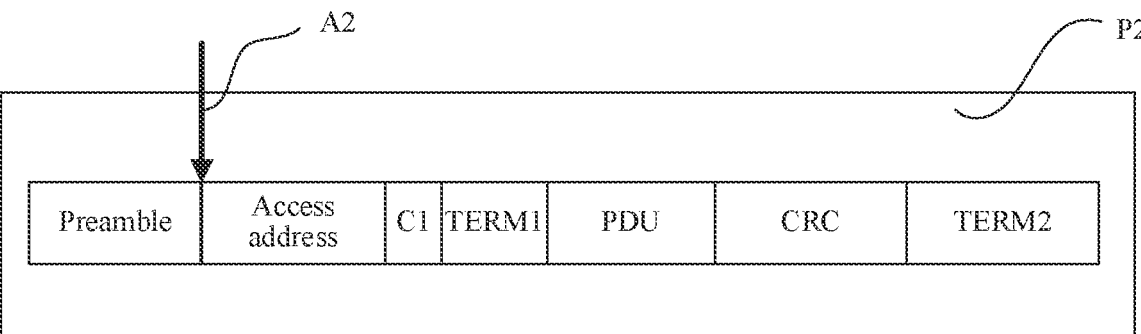

For the sending moment of the Bluetooth packet, a bit in a byte in a field in the Bluetooth packet may be used as a timing reference location at a packet sending moment. Since different Bluetooth packets have different structures, as shown in FIG. 2, a Bluetooth packet P1 is a Bluetooth packet whose physical layer of BLE is a non-coding physical layer, and a Bluetooth packet P2 is a Bluetooth packet whose physical layer of BLE is a coding physical layer. As shown in FIG. 2, composition structures of the Bluetooth packet P1 and the Bluetooth packet P2 are different. Therefore, the timing reference location is required to be a location shared by Bluetooth packets of different structures. Specifically, a sending moment of a first bit of an access address in a Bluetooth packet may be used as a sending moment of the BLE Bluetooth packet.

When the physical layer of BLE is a non-coding physical layer, a BLE Bluetooth packet P1 shown in FIG. 2 starts from a preamble (preamble) field, and an access-address (Access-Address) field generally follows the preamble field. The preamble field is mainly used to synchronize frequencies of receiving and sending clocks. A sending moment of a first bit A1 of an access address in the BLE Bluetooth packet P1 may be used as a sending moment of the BLE Bluetooth packet P1.

When the physical layer of BLE is a coding physical layer, a sending moment of a first bit A2 of an access address in a BLE Bluetooth packet P2 shown in FIG. 2 is used as a sending moment of the BLE Bluetooth packet P2.

A sending moment of a Bluetooth packet may be determined through the foregoing operations, and the determined sending moment of the Bluetooth packet further needs to be carried in the Bluetooth packet as a time stamp. In this way, when receiving the Bluetooth packet, a receiver may determine the sending moment of the Bluetooth packet based on the time stamp in the Bluetooth packet, that is, the receiver may learn, when obtaining the time stamp (the sending moment of the Bluetooth packet), a local time (standard time) of a transmitter when the transmitter sends the Bluetooth packet.

Specifically, the sending moment of the Bluetooth packet may be used as a time stamp and carried in a header of a protocol data unit (PDU, protocol data unit) (PDU header) of the Bluetooth packet. The sending moment of the Bluetooth packet may be a preset moment $t_A$, that is, the Bluetooth packet is preset to be sent at a moment (a pre-start sending moment to), and a first bit of an access address in the Bluetooth packet is sent at the moment $t_A$. The sending moment $t_A$ of the first bit of the access address in the Bluetooth packet is determined in the following manner:

Based on the composition structure of the Bluetooth packet shown in FIG. 2, an area before an access address may be determined as a preamble. A time period $T_P$ taken from start to end of sending the preamble may be determined based on historical sending data of the Bluetooth packet, and a pre-start sending moment of the Bluetooth packet is determined based on the time period $T_P$ taken from start to end of sending the preamble. For example, time periods $T_P$ taken from start to end of sending a plurality of preambles are first determined based on the historical sending data of the Bluetooth packet, and an average sending time period $\Delta T_P$ from start to end of sending the plurality of preambles is determined based on the plurality of time periods $T_P$. If the master device is preset to send a first bit of a preamble in a Bluetooth packet to the slave device at a moment $t_0$, a sending moment $t_A$ of the first bit of an access address in the Bluetooth packet may be determined as $t_A=(t_0+\Delta T_P)$. Further, when the Bluetooth packet is edited, the sending moment $t_A$ of the first bit of the access address obtained through calculation is used as a time stamp and carried in a PDU header of the Bluetooth packet, and the time stamp indicates that the sending moment of the first bit of the access address in the Bluetooth packet is $t_A$.

In some embodiments, the time stamp information (which may include the time stamp indication and the time stamp) may be carried in the Bluetooth packet by adding a field to the PDU header of the Bluetooth packet.

For a Bluetooth packet type, different Bluetooth packet types correspond to different structures of PDUs in Bluetooth packets. To be specific, when the Bluetooth packet type is a broadcast packet, a structure of a PDU header in a Bluetooth broadcast packet is shown as U1a in FIG. 3a, and when the Bluetooth packet type is a data packet, a structure of a PDU header in a Bluetooth data packet is shown as U2a in FIG. 3a.

Figure 3A:
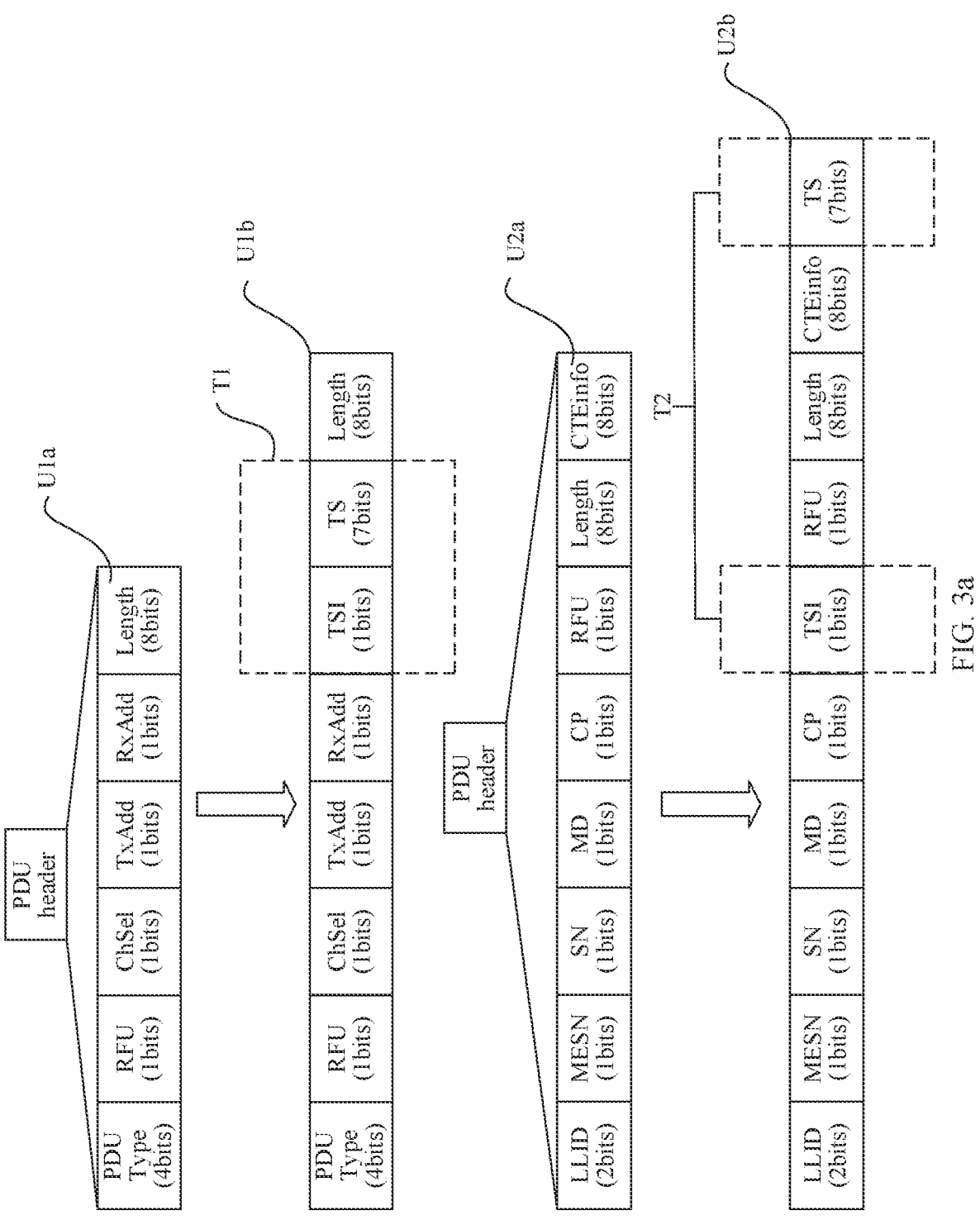
FIG. 3a is a schematic diagram of a time stamp location according to this application.

When a sent Bluetooth packet needs to carry the time stamp information, a new field is added to the PDU header structure U1a or the PDU header structure U2a shown in FIG. 3a, so that the time stamp information is carried in the sent Bluetooth packet to be provided for the receiver.

Specifically, the newly added field used as the time stamp information may include a first field and a second field. The first field and the second field are respectively a time stamp indication (TSI, Time Slot Indication) and a time stamp (TS, Time Slot). The time stamp indication TSI indicates whether a PDU header of a Bluetooth physical frame in a Bluetooth packet carries a time stamp. Specifically, if it is determined that the Bluetooth physical frame carries the time stamp indication TSI, it indicates that the Bluetooth physical frame further carries a time stamp TS; or if it is determined that the Bluetooth physical frame does not include the time stamp indication, it indicates that no time stamp TS is carried. In addition, the carried time stamp TS includes a sending moment of the Bluetooth packet, that is, the time stamp may be a sending moment of a first bit of an access address in the Bluetooth packet. Specifically, as shown in FIG. 3a, the Bluetooth packet may be a broadcast packet and a data packet, and both the broadcast packet and the data packet may carry time stamp information indicating a sending moment of a first bit of an access address in the Bluetooth packet. When the Bluetooth packet is a broadcast packet, a PDU header in the broadcast packet is shown as U1a in FIG. 3a. A field is added to the PDU header U1a, that is, time stamp information T1 is encapsulated in a protocol data unit header to obtain a PDU header U1b including the time stamp information T1. The time stamp information T1 may include a time stamp indication TSI and a time stamp TS. When the Bluetooth packet is a data packet, a PDU header in the broadcast packet is shown as U2a in FIG. 3a. A field is added to the PDU header U2a, that is, time stamp information T2 is encapsulated in the protocol data unit header to obtain a PDU header U2b including the time stamp information T2.

In this embodiment, a receiver of a Bluetooth packet may determine whether a newly added field exists in a PDU header of the received Bluetooth packet. To be specific, the receiver may determine whether a first field of a time stamp indication TSI exists in the newly added field in the PDU header, and further obtain, if the first field exists, corresponding information of a second field indicating a time stamp in the newly added field. Otherwise, if the first field does not exist, the receiver determines that no newly added field (the first field and the second field) exists in the PDU header, the time stamp information is not carried in the current Bluetooth packet.

Figure 3B:
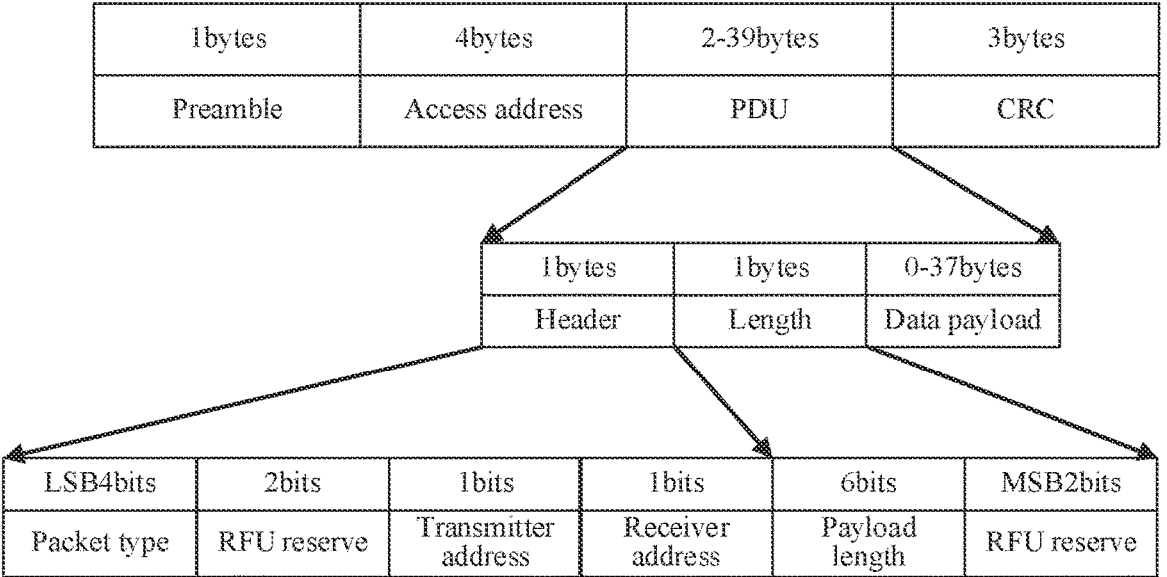
FIG. 3b is a schematic diagram of a structure of a Bluetooth broadcast packet according to this application.

In some other embodiments, the time stamp indication and the time stamp may be carried in the Bluetooth packet without adding a field. Details are as follows:

FIG. 3b is a schematic diagram of a structure of a Bluetooth broadcast packet according to this application. In a possible implementation, an information meaning indicated by a field of a packet type shown in FIG. 3b may be further extended, and a reserved bit of the packet type is extended based on an original packet type for use. Using a broadcast packet type as an example, there are seven original packet types, where a packet type of LSB=0000 represents a general broadcast indication, a packet type of LSB=0001 represents a directional connection indication, a packet type of LSB=0010 represents a non-connectable indication, a packet type of LSB=0011 represents an active scan request, a packet type of LSB=0100 represents an active scan response, a packet type of LSB=0101 represents a connection request, a packet type of LSB=0110 represents a scannable indication, and LSB=0111-1111 are fields reserved for future use. The fields reserved for future use are extended for use, and an attribute value may be added to an LSB (least significant bit) field that represents a packet type in a PDU header. For example, a packet type of LSB=1010 may represent a time synchronization instruction, that is, when the packet type is LSB=1010, the slave device determines that the broadcast packet type is a time synchronization broadcast packet, and a PDU header of a Bluetooth physical frame carries time stamp information (a sending moment of a current Bluetooth packet). When the packet type is LSB=1010, the slave device may adjust a local time to the sending moment.

When the packet type is LSB=1011, the slave device determines the broadcast packet type is a time synchronization broadcast packet, and a PDU header of a Bluetooth physical frame carries time stamp information (a sending moment of the Bluetooth packet and delay information between the master device and the slave device). When the packet type is LSB=1011, the slave device may adjust a local time based on the sending moment of the Bluetooth packet and the delay information between the master device and the slave device in the time stamp information, to achieve synchronization between a local time adjusted by the slave device and a time of the master device.

If the Bluetooth packet is a data packet, time synchronization is achieved in the same way based on the above. Details are not described herein again.

In a possible implementation, 1 bit or multiple bits in a field reserved for future use (RFU, reserved for future use) in the PDU header of the Bluetooth broadcast packet shown in FIG. 3b may be further used as a time stamp indication TSI. For example, bit0 in the field reserved for future use (RFU) in the PDU header of the Bluetooth broadcast packet is used as a TSI. When bit0 is 1, that is, RFU=X1 (where bit1 is X, and X is 0 or 1), it indicates that the Bluetooth physical frame carries a time stamp TS. Otherwise, when bit0 is 0, that is, RFU=X0 (where bit1 is X, and X is 0 or 1), it indicates that the PDU header of the Bluetooth physical frame does not carry a time stamp TS.

Figure 3C:
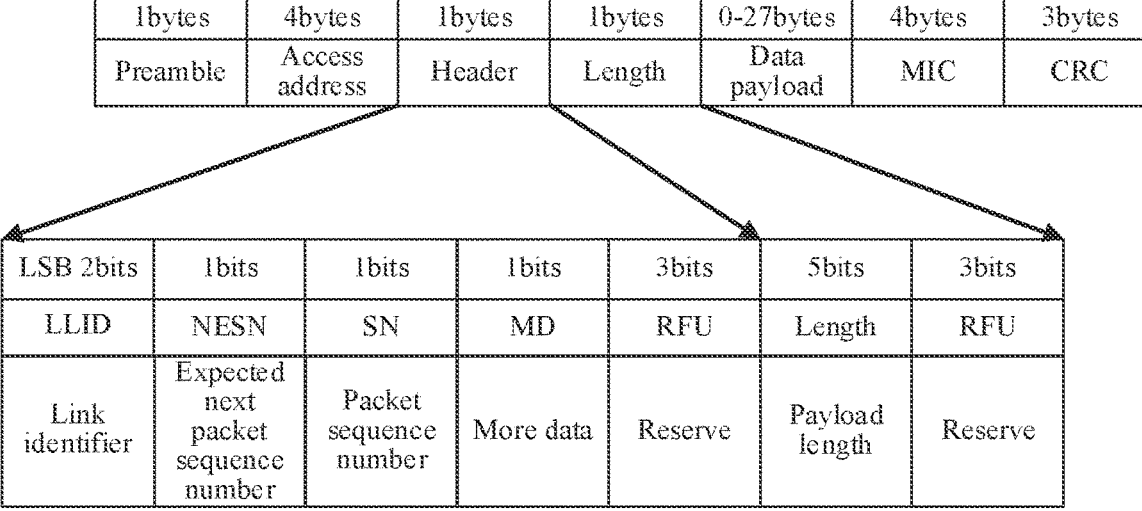
FIG. 3c is a schematic diagram of a structure of a Bluetooth data packet according to this application.

FIG. 3c is a schematic diagram of a structure of a Bluetooth data packet according to this application. In a possible implementation, 1 bit or multiple bits in a field reserved for future use in a PDU header of a Bluetooth data packet shown in FIG. 3c may be used as a time stamp indication TSI. For example, bit0 in the field reserved for future use (RFU) in the PDU header of the Bluetooth data packet is used as a TSI. When bit0 is 1, that is, RFU=$X_2X_1$1 (where bit1 is $X_1$, bit2 is $X_2$, $X_1$ is 0 or 1, and $X_2$ is 0 or 1), it indicates that the Bluetooth physical frame carries a time stamp TS. Otherwise, when bit0 is 0, that is, RFU=$X_2X_1$0 (where bit1 is X1, bit2 is X2, X1 is 0 or 1, and X2 is 0 or 1), it indicates that the Bluetooth physical frame does not carry a time stamp TS.

In a possible implementation, the time stamp information may be directly transmitted in a form of a payload (payload) in the Bluetooth broadcast packet or the Bluetooth data packet. Specifically, if the Bluetooth broadcast packet or the Bluetooth data packet carries a time stamp indication TSI, the time stamp information is transmitted through a part (N bits) or all of a length of a payload of the broadcast packet or the data packet shown in FIG. 3b or FIG. 3c.

The present invention provides the following embodiments to describe time synchronization between a master device and a slave device.

When a transmission delay Delay between the master device and the slave device and a time difference Offset caused by a frequency deviation between clocks of the master device and the slave device are not considered, a time synchronization method between the master device and the slave device according to Embodiment 1 is provided below.

Embodiment 1

Figure 4:
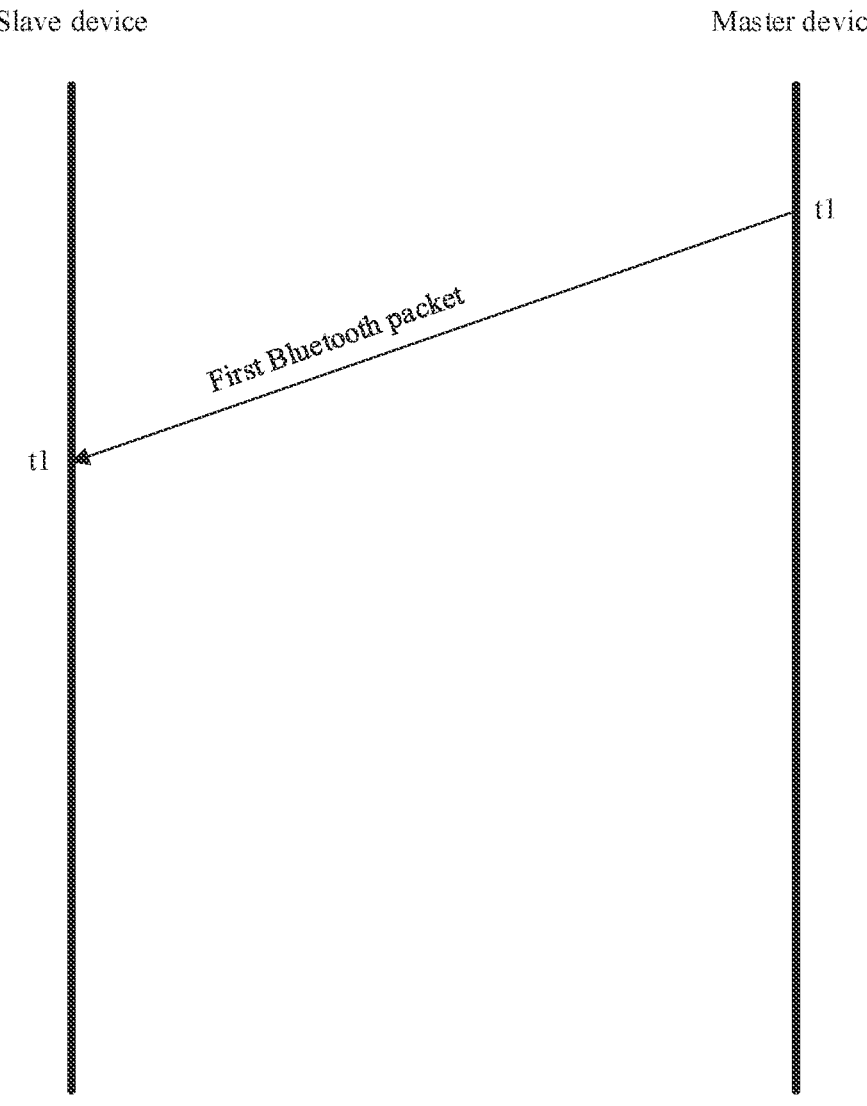
FIG. 4 is a schematic diagram of a time synchronization manner according to this application.

FIG. 4 is a schematic diagram of a time synchronization manner according to this application. As shown in FIG. 4, a master device sends a first Bluetooth packet to a slave device. The first Bluetooth packet carries first time stamp information, and the first time stamp information is a sending moment $t_1$ that is of a first bit of an access address in the first Bluetooth packet and that is determined based on a clock of the master device. When receiving the first Bluetooth packet sent by the master device, the slave device obtains the sending moment $t_1$ in the first time stamp information in the first Bluetooth packet. The slave device considers the sending moment $t_1$ carried in the first Bluetooth packet as a receiving moment at which the slave device receives the first Bluetooth packet. In other words, the slave device may correct a local time of the slave device when obtaining the sending moment $t_1$, and specifically, may adjust the local time of the slave device to the sending moment $t_1$.

The time synchronization method provided in Embodiment 1 is described above. A BLE transmission distance is generally less than 100 m, a wireless signal transmission rate is 3*10^8 m/s, a transmission time required for a distance of 100 m is 0.3 μs, and a round-trip transmission delay is less than 1 μs. Based on the above, compared with a synchronization requirement of 100 μs, the transmission delay can be ignored. Even when the transmission delay Delay between the master device and the slave device and the time difference Offset caused by the frequency deviation between the clocks of the master device and the slave device are not considered, the local time of the slave device is corrected based on a time stamp sent by the master device through a Bluetooth packet. In this way, there is no need to obtain a network time, and influences of uncertainty of BLE scheduling and an unfixed bottom-layer transmission delay that are caused by transmitting time information through a BLE data channel are avoided. In addition, the time synchronization method provided in Embodiment 1 can meet a 100 μs-level time synchronization requirement in a common scene.

When the transmission delay Delay between the master device and the slave device is considered, and the time difference Offset caused by the frequency deviation between the clocks of the master device and the slave device is not considered, a time synchronization method between the master device and the slave device according to Embodiment 2 is provided below.

Embodiment 2

Figure 5A:
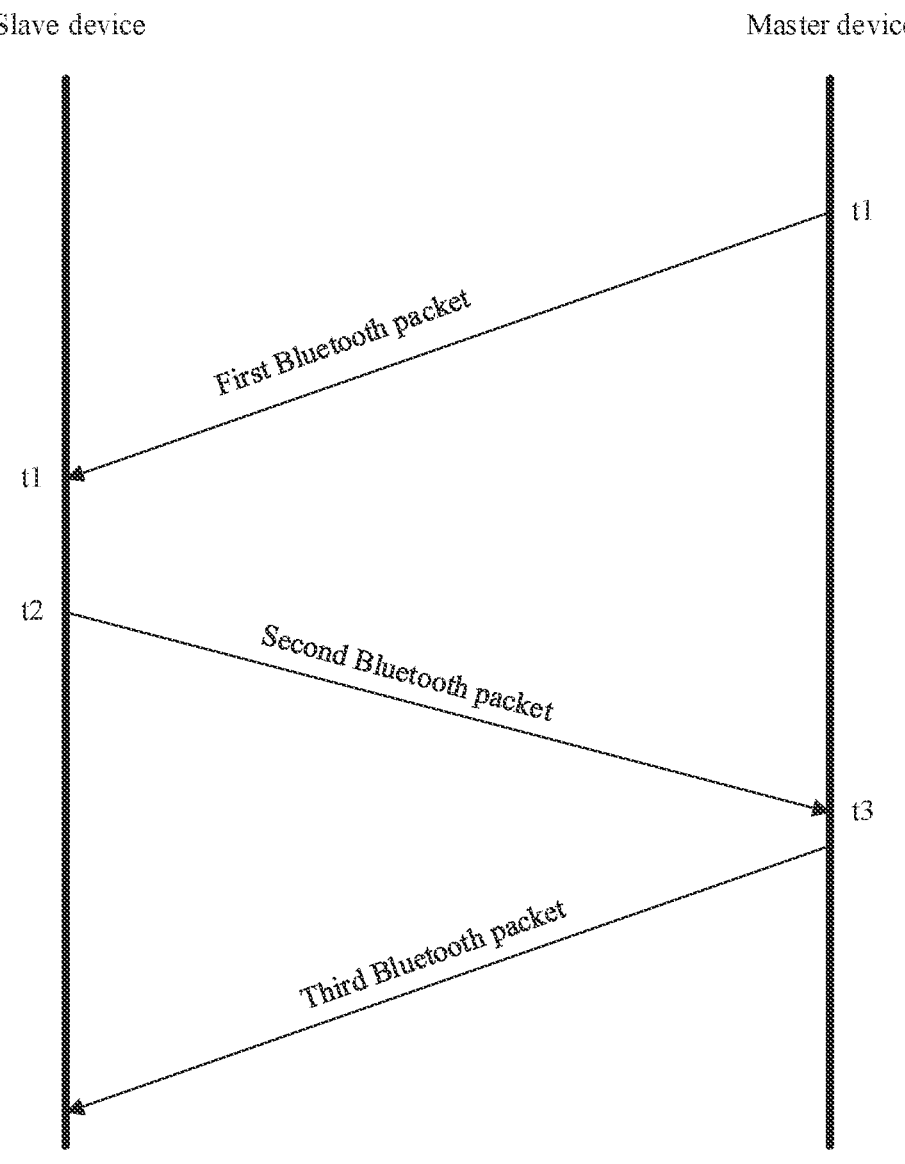
FIG. 5a is a schematic diagram of another time synchronization manner according to this application.

FIG. 5a is a schematic diagram of another time synchronization manner according to this application. As shown in FIG. 5a, a master device sends a first Bluetooth packet to a slave device. The first Bluetooth packet carries first time stamp information, the first time stamp information is a sending moment $t_1$ of the master device, and the sending moment $t_1$ is a sending moment that is of a first bit of an access address in the first Bluetooth packet and that is determined based on a clock of the master device. When receiving the first Bluetooth packet sent by the master device, the slave device obtains the sending moment $t_1$ in the first time stamp information in the first Bluetooth packet. The slave device considers the sending moment $t_1$ carried in the first Bluetooth packet as a receiving moment at which the slave device receives the first Bluetooth packet. In other words, the slave device may correct a local time of the slave device when obtaining the sending moment $t_1$, and specifically, may pre-adjust the local time of the slave device to the sending moment $t_1$. Alternatively, the local time of the slave device may be pre-adjusted to a sending moment $t_1$+dt1, where dt1 is a processing time period dt1 taken by the slave device to adjust, after the first Bluetooth packet is received, the local time of the slave device based on the sending moment $t_1$ in the first Bluetooth packet. In other words, the slave device starts timing when receiving the first Bluetooth packet, ends the timing and determines the processing time period dt1 before local time adjustment, and adjusts the local time of the slave device to the sending moment $t_1$+dt1.

Since a transmission delay Delay exists in a transmission phase in which the master device transmits the first Bluetooth packet to the slave device, there is a time difference between a current local time of the slave device and a current local time of the master device, and the time difference is the transmission delay Delay. To obtain the transmission delay Delay, the slave device sends a second Bluetooth packet to the master device. The second Bluetooth packet carries second time stamp information, the second time stamp information indicates a sending moment $t_2$ of the second Bluetooth packet, and the sending moment $t_2$ is a sending moment that is of a first bit of an access address in the second Bluetooth packet and that is determined based on a current clock of the slave device.

The master device determines, based on a local clock, a receiving moment $t_3$ at which the second Bluetooth packet sent by the slave device is received, and obtains the sending moment $t_2$ carried in the second Bluetooth packet.

The master device determines the transmission delay between the master device and the slave device based on the sending moment $t_1$ of the first Bluetooth packet, the sending moment $t_2$ of the second Bluetooth packet, and the receiving moment $t_3$ of the second Bluetooth packet. A specific calculation process is as follows:

$t_3-t_1$ is a time period used for one information exchange between the master device and the slave device, $t_2-t_1$ is a local processing delay between receiving the first Bluetooth packet and sending the second Bluetooth packet by the slave device, and $t_2-t_1$ includes the processing time period dt1 taken to adjust the local time of the slave device. Based on the above, $(t_3-t_1)-(t_2-t_1)$ may be obtained as a sum of time periods used in transmission phases of the first Bluetooth packet and the second Bluetooth packet. Further, an average unidirectional transmission delay between the master device and the slave device may be calculated by using the following formula:

$$T_1 = \frac{t_3 - t_1 - (t_2 - t_1)}{2}$$

$T_1$ represents the average unidirectional transmission delay between the master device and the slave device.

When calculating the average unidirectional transmission delay $T_1$ between the master device and the slave device, the master device sends a third Bluetooth packet to the slave device. The third Bluetooth packet carries third time stamp information, and the third time stamp information indicates the average unidirectional transmission delay $T_1$ between the master device and the slave device. It should be noted that, in addition to information indicating a sending moment of a Bluetooth packet, time stamp information carried in the Bluetooth packet may further be corresponding information indicating a delay between the master device and the slave device, for example, the information indicating the average unidirectional transmission delay $T_1$ between the master device and the slave device. In addition to the information indicating the sending moment of the Bluetooth packet or the information indicating the delay between the master device and the slave device, a time stamp TS in the time stamp information may further include a corresponding information identifier. For example, the time stamp TS includes first information indicating a sending moment of a Bluetooth packet, first identification information indicating that the first information is the sending moment of the Bluetooth packet, second information indicating a transmission delay between the master device and the slave device, and second identification information indicating that the second information is the transmission delay between the master device and the slave device. The slave device may determine a type of the received information based on the identification information in the time stamp TS, and performs a corresponding time synchronization operation after determining the type of the information.

The slave device receives the third Bluetooth packet sent by the master device, obtains the average unidirectional transmission delay $T_1$ in the third time stamp, and corrects the local time of the slave device based on the average unidirectional transmission delay $T_1$. To be specific, the average unidirectional transmission delay $T_1$ is added to a current local time (a current local time obtained in any one of the foregoing pre-adjustment manners) of the slave device, to obtain a corrected local time of the slave device, thereby achieving time synchronization between the slave device and the master device.

The time synchronization method provided in Application 2 is described above. Compared with Embodiment 1, the transmission delay Delay between the master device and the slave device is considered during time synchronization between the master device and the slave device. After the time synchronization operation in Embodiment 2 is performed, precision of the time difference between the master device and the slave device is further improved. Based on the above, the time synchronization method provided in Embodiment 2 can meet a time synchronization requirement in a scene requiring for higher precision.

When both the transmission delay Delay between the master device and the slave device and the time difference Offset caused by the frequency deviation between the clocks of the master device and the slave device are considered, a time synchronization method between the master device and the slave device according to Embodiment 3 is provided below.

Figure 5B:
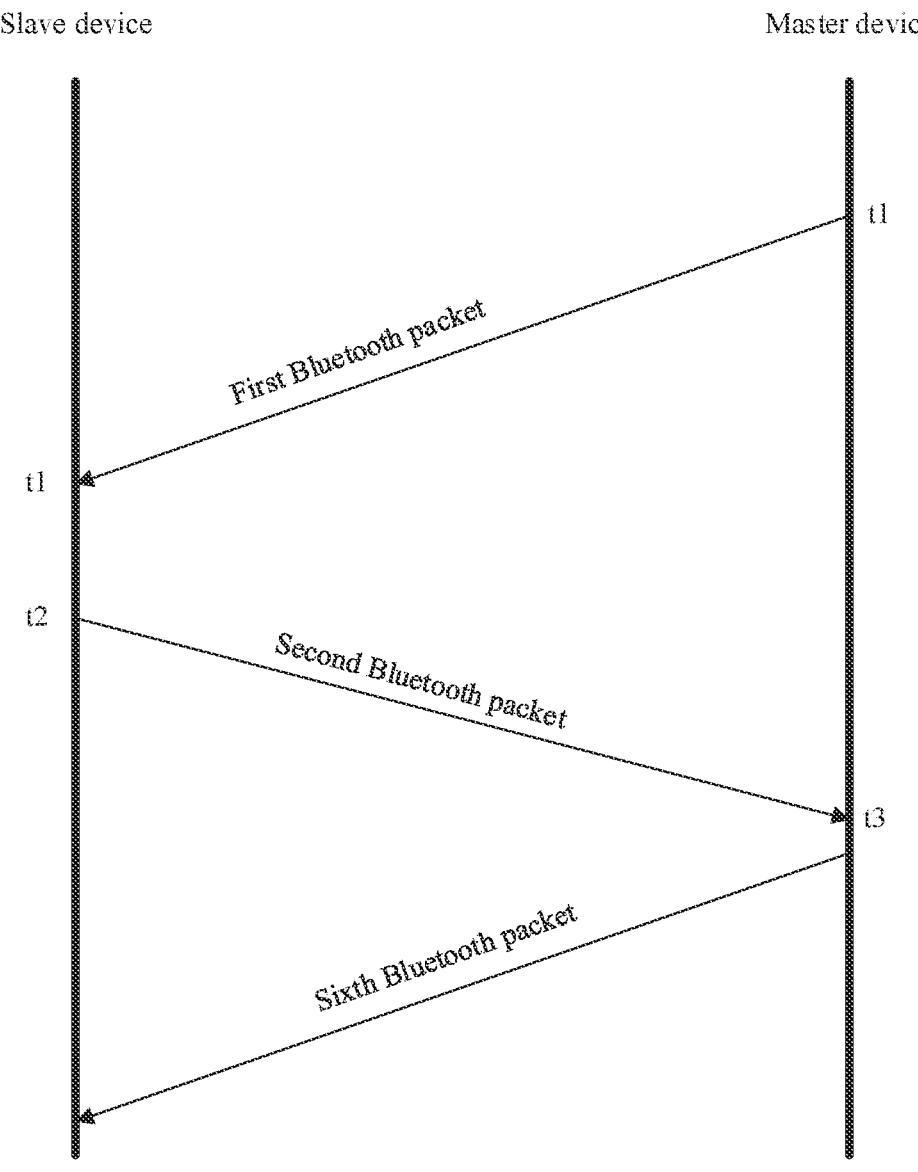
FIG. 5b is a schematic diagram of another time synchronization manner according to this application.

In the foregoing manner, delay information between the master device and the slave device is calculated on a side of the master device. In another implementation, the delay information between the master device and the slave device may further be calculated on a side of the slave device. Details are as follows:

FIG. 5b is a schematic diagram of another time synchronization manner according to this application. As shown in FIG. 5b, a master device sends a first Bluetooth packet to a slave device. The first Bluetooth packet carries first time stamp information, the first time stamp information is a sending moment $t_1$ of the master device, and the sending moment $t_1$ is a sending moment that is of a first bit of an access address in the first Bluetooth packet and that is determined based on a clock of the master device. When receiving the first Bluetooth packet sent by the master device, the slave device obtains the sending moment $t_1$ in the first time stamp information in the first Bluetooth packet. The slave device considers the sending moment $t_1$ carried in the first Bluetooth packet as a receiving moment at which the slave device receives the first Bluetooth packet. In other words, the slave device may correct a local time of the slave device when obtaining the sending moment $t_1$, and specifically, may pre-adjust the local time of the slave device to the sending moment $t_1$. Alternatively, the local time of the slave device may be pre-adjusted to a sending moment $t_1+dt1$, where dt1 is a processing time period dt1 taken by the slave device to adjust, after the first Bluetooth packet is received, the local time of the slave device based on the sending moment $t_1$ in the first Bluetooth packet. In other words, the slave device starts timing when receiving the first Bluetooth packet, ends the timing and determines the processing time period dt1 before local time adjustment, and adjusts the local time of the slave device to the sending moment $t_1+dt1$.

Since a transmission delay Delay exists in a transmission phase in which the master device transmits the first Bluetooth packet to the slave device, there is a time difference between a current local time of the slave device and a current local time of the master device, and the time difference is the transmission delay Delay. To obtain the transmission delay Delay, the slave device sends a second Bluetooth packet to the master device. The second Bluetooth packet carries second time stamp information, the second time stamp information indicates a sending moment $t_2$ of the second Bluetooth packet, and the sending moment $t_2$ is a sending moment that is of a first bit of an access address in the second Bluetooth packet and that is determined based on a current clock of the slave device.

After determining, based on a local clock, a receiving moment $t_3$ at which the second Bluetooth packet sent by the slave device is received, the master device sends a sixth Bluetooth packet to the slave device. The sixth Bluetooth packet carries sixth time stamp information, and the sixth time stamp information includes the receiving moment $t_1$ of the second Bluetooth packet.

The slave device obtains the receiving moment $t_3$ of the second Bluetooth packet included in the sixth time stamp information from the sixth Bluetooth packet sent by the master device. Further, the transmission delay between the master device and the slave device is determined based on the sending moment $t_1$ of the first Bluetooth packet, the sending moment $t_2$ of the second Bluetooth packet, and the receiving moment $t_3$ of the second Bluetooth packet. A specific calculation process is as follows:

$t_3-t_1$ is a time period used for one information exchange between the master device and the slave device, $t_2-t_1$ is a local processing delay between receiving the first Bluetooth packet and sending the second Bluetooth packet by the slave device, and $t_2-t_1$ includes the processing time period dt1 taken to adjust the local time of the slave device. Based on the above, $(t_3-t_1)-(t_2-t_1)$ may be obtained as a sum of time periods used in transmission phases of the first Bluetooth packet and the second Bluetooth packet. Further, an average unidirectional transmission delay between the master device and the slave device may be calculated by using the following formula:

$$T_1 = \frac{t_3 - t_1 - (t_2 - t_1)}{2}$$

$T_1$ represents the average unidirectional transmission delay between the master device and the slave device.

The slave device corrects the local time of the slave device based on the average unidirectional transmission delay $T_1$. To be specific, the average unidirectional transmission delay $T_1$ is added to a current local time (a current local time obtained in any one of the foregoing pre-adjustment manners) of the slave device, to obtain a corrected local time of the slave device, thereby achieving time synchronization between the slave device and the master device.

Embodiment 3

Figure 6A:
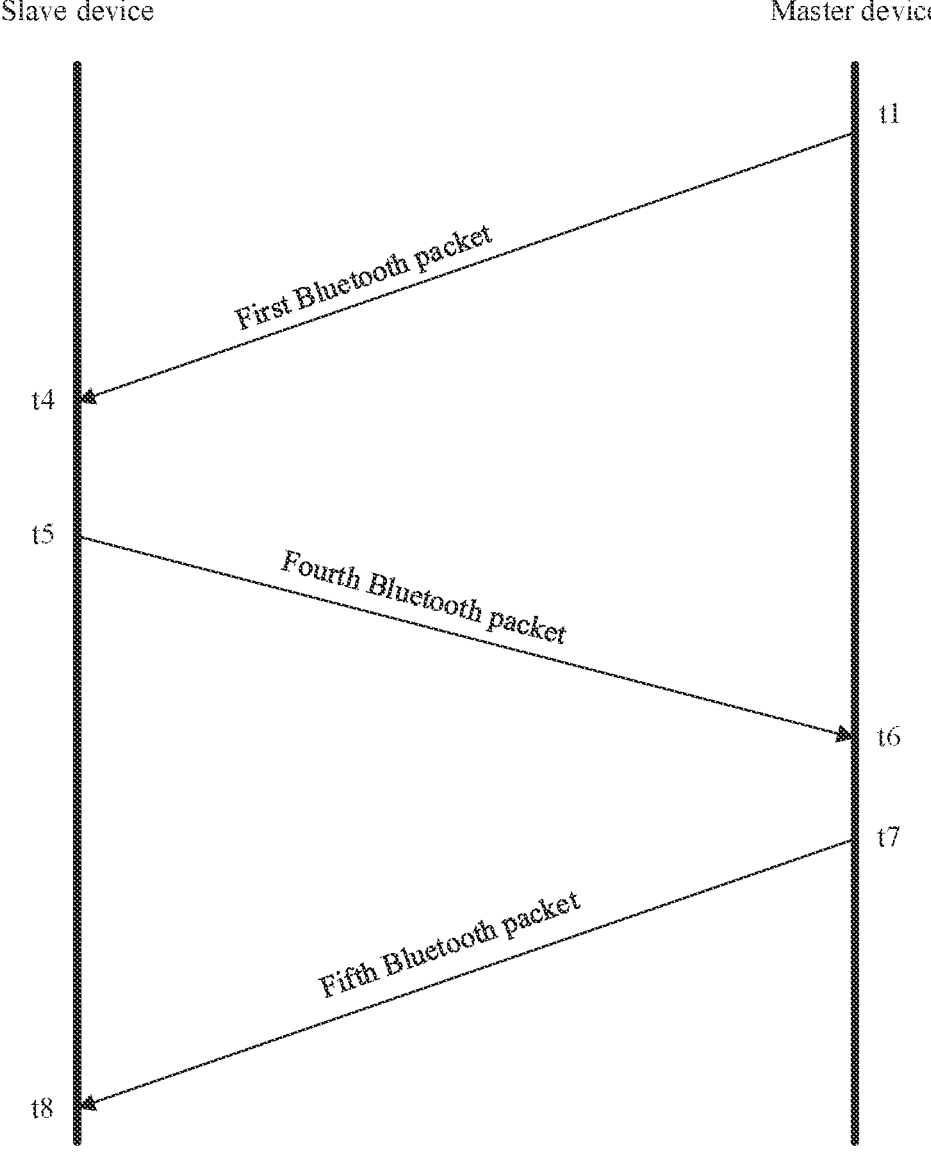
FIG. 6a is a schematic diagram of another time synchronization manner according to this application.

FIG. 6*a* is a schematic diagram of another time synchronization manner according to this application. As shown in FIG. 6*a*, a master device sends a first Bluetooth packet to a slave device. The first Bluetooth packet carries first time stamp information, the first time stamp information is a sending moment $t_1$ of the master device, and the sending moment $t_1$ is a sending moment that is of a first bit of an access address in the first Bluetooth packet and that is determined based on a clock of the master device.

When receiving the first Bluetooth packet, the slave device determines, based on a clock of the slave device, a receiving moment $t_4$ at which the first Bluetooth packet is received.

Considering that a frequency deviation between the clock of the master device and the clock of the slave device causes a time difference between a current local time of the slave device and a current local time of the master device, and a transmission delay Delay exists in a transmission phase in which the master device transmits a Bluetooth packet to the slave device, to achieve high-precision time synchronization, the transmission delay Delay and the time difference (frequency offset time difference) Offset caused by the frequency deviation between the clock of the master device and the clock of the slave device need to be determined, so that the local time of the slave device is adjusted through the transmission delay Delay and the frequency offset time difference Offset, thereby achieving time synchronization between the slave device and the master device.

To obtain the transmission delay Delay and the frequency offset time difference Offset, the slave device sends a fourth Bluetooth packet to the master device. The fourth Bluetooth packet carries fourth time stamp information, and the fourth time stamp information includes: the receiving moment $t_4$ at which the first Bluetooth packet is received and a sending moment $t_5$ of the fourth Bluetooth packet.

When receiving the fourth Bluetooth packet, the master device determines a receiving moment $t_6$ of the fourth Bluetooth packet based on a local clock, and obtains the receiving moment $t_4$ of the first Bluetooth packet and the sending moment $t_5$ of the fourth Bluetooth packet in the fourth time stamp in the fourth Bluetooth packet.

The master device may determine the following information based on the moment $t_1$ at which the master device sends the first Bluetooth packet, the moment $t_4$ at which the slave device receives the first Bluetooth packet, the moment $t_5$ at which the slave device sends the fourth Bluetooth packet, and the moment $t_6$ at which the master device receives the fourth Bluetooth packet:

$(t_4-t_1)$=Delay−Offset;

$(t_6-t_5)$=Delay+Offset;

Further, the master device may further calculate an average unidirectional transmission delay Delay and a frequency offset time difference Offset between the master device and the slave device based on the moment $t_1$ at which the master device sends the first Bluetooth packet, the receiving moment $t_4$ at which the slave device receives the first Bluetooth packet, the moment $t_5$ at which the slave device sends the fourth Bluetooth packet, and the moment $t_6$ at which the master device receives the fourth Bluetooth packet. A specific calculation process is as follows:

$$T_2 = \frac{[(t_6 - t_5) + (t_4 - t_1)]}{2}$$

$T_2$ represents the average unidirectional transmission delay Delay between the master device and the slave device.

$$T_3 = \frac{[(t_6 - t_5) - (t_4 - t_1)]}{2}$$

$T_3$ represents the frequency offset time difference Offset between the master device and the slave device. The calculated Offset is a value with a symbol. $t_4-t_1$=Delay−Offset is assumed to be a time period that the slave device is Offset slower than the master device. If the calculated Offset is a "positive value", it indicates that the slave device is slower. If the calculated Offset is a "negative value", it indicates that the slave device is faster. In $t_4-t_1$=Delay−Offset, it is assumed that the slave device is Offset slower than the master device, that is, it is assumed that the master device is Offset faster than the slave device. Based on the above, $t_6-t_5$=Delay+Offset. If the calculated Offset is a "positive value", it indicates that the slave device is slower, or if the calculated Offset is a "negative value", it indicates that the slave device is faster.

When calculating the average unidirectional transmission delay Delay between the master device and the slave device and the frequency offset time difference Offset between the master device and the slave device, the master device sends a fifth Bluetooth packet to the slave device. The fifth Bluetooth packet carries a fifth time stamp, and the fifth time stamp includes the average unidirectional transmission delay Delay between the master device and the slave device, the frequency offset time difference Offset between the master device and the slave device, and a moment $t_7$ at which the master device sends the fifth Bluetooth packet.

In addition to information indicating a sending moment of a Bluetooth packet or information indicating a delay between the master device and the slave device, a time stamp TS in the time stamp information may further include a corresponding information identifier. For example, the time stamp TS includes first information indicating a sending moment of a Bluetooth packet, first identification information indicating that the first information is the sending moment of the Bluetooth packet, second information indicating a transmission delay between the master device and the slave device, second identification information indicating that the second information is the transmission delay between the master device and the slave device, third information indicating a frequency offset time difference between the master device and the slave device, and third identification information indicating that the third information is the frequency offset time difference between the master device and the slave device. The slave device may determine a type of the received information based on the identification information in the time stamp TS, and performs a corresponding time synchronization operation after determining the type of the information.

The slave device determines, based on the clock of the slave device, that the fifth Bluetooth packet sent by the master device is received at a moment $t_8$, and obtains the average unidirectional transmission delay Delay between the master device and the slave device and the frequency offset time difference Offset between the master device and the slave device that are included in the fifth time stamp. When receiving the fifth Bluetooth packet, the slave device adjusts the local time of the slave device to ($t_8$+Offset) based on the local time of the slave device and the frequency offset time difference Offset between the master device and the slave device. Since there is a transmission delay Delay when the master device sends the fifth Bluetooth packet to the slave device, the transmission delay Delay is further eliminated based on ($t_8$+Offset). In other words, when receiving the fifth Bluetooth packet, the slave device adjusts the local time to ($t_8$+Offset)+Delay. In such a synchronization process, a local data processing delay also exists, and a local data processing delay dt2 may be further eliminated based on ($t_8$+Offset)+Delay, where dt2 is a processing time dt2 taken by the slave device to adjust the local time $t_8$ to ($t_8$+Offset)+Delay.

The time synchronization method provided in Application 3 is described above. Compared with Embodiment 1 and Embodiment 2, in Embodiment 3, both the transmission delay Delay between the master device and the slave device and the time difference Offset caused by the frequency deviation between the clocks of the master device and the slave device are considered during time synchronization between the master device and the slave device. After the time synchronization operation in Embodiment 3 is performed, precision of the time difference between the master device and the slave device is further improved. Based on the above, the time synchronization method provided in Embodiment 3 can meet a time synchronization requirement in a scene requiring for higher precision.

Figure 6B:
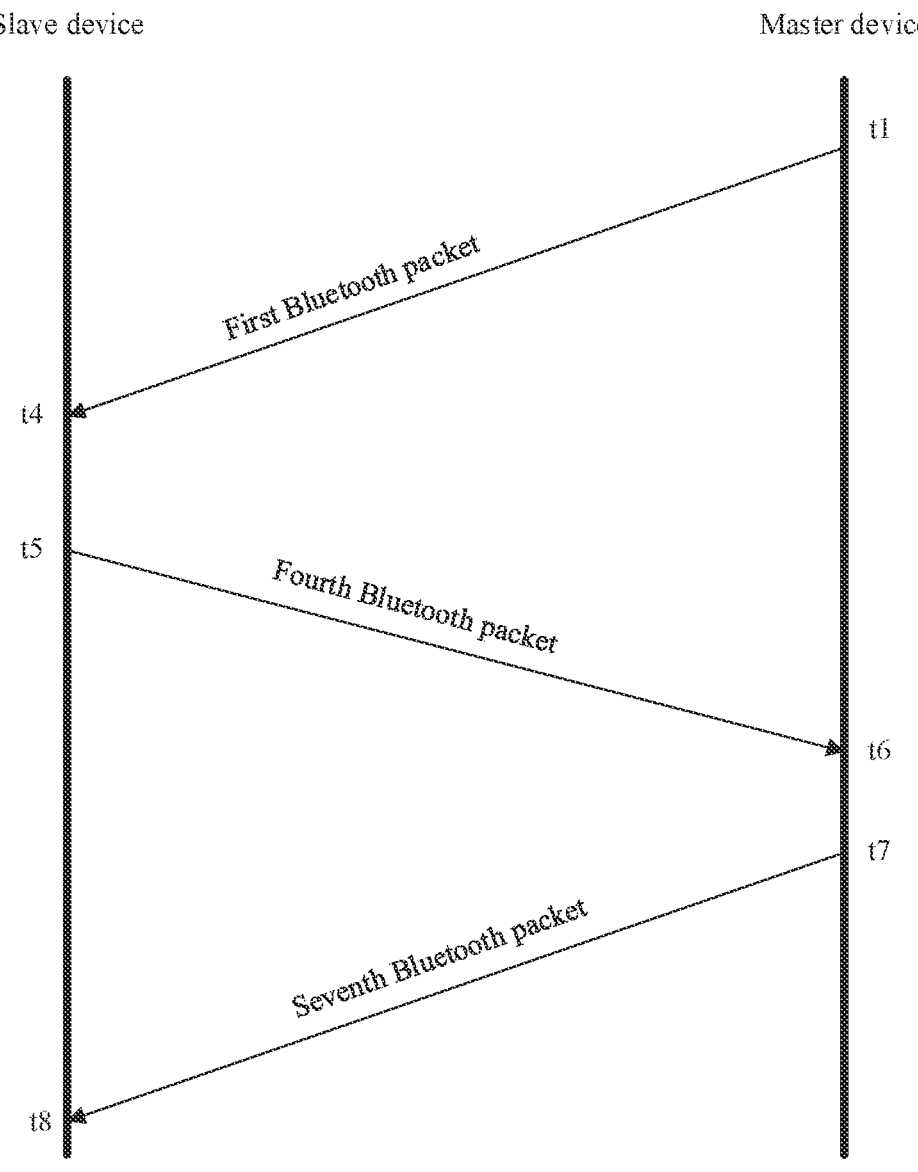
FIG. 6b is a schematic diagram of another time synchronization manner according to this application.

In the foregoing manner, delay information between the master device and the slave device is calculated on a side of the master device. In another implementation, the delay information between the master device and the slave device may further be calculated on a side of the slave device. Details are as follows:

FIG. 6b is a schematic diagram of another time synchronization manner according to this application. As shown in FIG. 6b, a master device sends a first Bluetooth packet to a slave device. The first Bluetooth packet carries first time stamp information, the first time stamp information is a sending moment $t_1$ of the master device, and the sending moment $t_1$ is a sending moment that is of a first bit of an access address in the first Bluetooth packet and that is determined based on a clock of the master device.

When receiving the first Bluetooth packet, the slave device determines, based on a clock of the slave device, a receiving moment $t_4$ at which the first Bluetooth packet is received.

Considering that a frequency deviation between the clock of the master device and the clock of the slave device causes a time difference between a current local time of the slave device and a current local time of the master device, and a transmission delay Delay exists in a transmission phase in which the master device transmits a Bluetooth packet to the slave device, to achieve high-precision time synchronization, the transmission delay Delay and the time difference (frequency offset time difference) Offset caused by the frequency deviation between the clock of the master device and the clock of the slave device need to be determined, so that the local time of the slave device is adjusted through the transmission delay Delay and the frequency offset time difference Offset, thereby achieving time synchronization between the slave device and the master device.

To obtain the transmission delay Delay and the frequency offset time difference Offset, the slave device sends a fourth Bluetooth packet to the master device. The fourth Bluetooth packet carries fourth time stamp information, and the fourth time stamp information includes: the receiving moment $t_4$ at which the first Bluetooth packet is received and a sending moment $t_5$ of the fourth Bluetooth packet.

After the master device determines, when receiving the fourth Bluetooth packet, a receiving moment $t_6$ of the fourth Bluetooth packet based on a local clock, the master device sends a seventh Bluetooth packet to the slave device. The seventh Bluetooth packet carries seventh time stamp information, and the seventh time stamp information includes the receiving moment $t_6$ of the fourth Bluetooth packet.

The slave device determines, based on the clock of the slave device, that the seventh Bluetooth packet is received at a moment $t_8$, and the slave device obtains the receiving moment $t_6$ of the fourth Bluetooth packet in the seventh time stamp information from the received seventh Bluetooth packet sent by the master device. Further, the slave device may determine the following information based on the moment $t_1$ of the first Bluetooth packet, the moment $t_4$ of the first Bluetooth packet, the moment $t_5$ of the fourth Bluetooth packet, and the moment $t_6$ of the fourth Bluetooth packet:

$$(t_4-t_1)=\text{Delay}-\text{Offset};$$

$$(t_6-t_5)=\text{Delay}+\text{Offset};$$

Further, the slave device may further calculate an average unidirectional transmission delay Delay and a frequency offset time difference Offset between the master device and the slave device based on the moment $t_1$ of the first Bluetooth packet, the receiving moment $t_4$ of the first Bluetooth packet, the moment $t_5$ of the fourth Bluetooth packet, and the moment $t_6$ of the fourth Bluetooth packet. A specific calculation process is as follows:

$$T_2 = \frac{[(t_6 - t_5) + (t_4 - t_1)]}{2}$$

$T_2$ represents the average unidirectional transmission delay Delay between the master device and the slave device.

$$T_3 = \frac{[(t_6 - t_5) - (t_4 - t_1)]}{2}$$

$T_3$ represents the frequency offset time difference Offset between the master device and the slave device. The calculated Offset is a value with a symbol. $t_4-t_1=\text{Delay}-\text{Offset}$ is assumed to be a time period that the slave device is Offset slower than the master device. If the calculated Offset is a "positive value", it indicates that the slave device is slower. If the calculated Offset is a "negative value", it indicates that the slave device is faster. In $t_4-t_1=\text{Delay}-\text{Offset}$, it is assumed that the slave device is Offset slower than the master device, that is, it is assumed that the master device is Offset faster than the slave device. Based on the above, $t_6-t_5=\text{Delay}+\text{Offset}$. If the calculated Offset is a "positive value", it indicates that the slave device is slower, or if the calculated Offset is a "negative value", it indicates that the slave device is faster.

The slave device may adjust the local time of the slave device to $(t_8+\text{Offset})$ based on the local time of the slave device and the frequency offset time difference Offset between the master device and the slave device. Since there is a transmission delay Delay when the master device sends the fifth Bluetooth packet to the slave device, the transmission delay Delay is further eliminated based on $(t_8+\text{Offset})$. In other words, when receiving the fifth Bluetooth packet, the slave device adjusts the local time to $(t_8+\text{Offset})+\text{Delay}$. In such a synchronization process, a local data processing delay also exists, and a local data processing delay dt2 may be further eliminated based on $(t_8+\text{Offset})+\text{Delay}$, where dt2 is a processing time dt2 taken by the slave device to adjust the local time $t_8$ to $(t_8+\text{Offset})+\text{Delay}$.

Figure 7A:
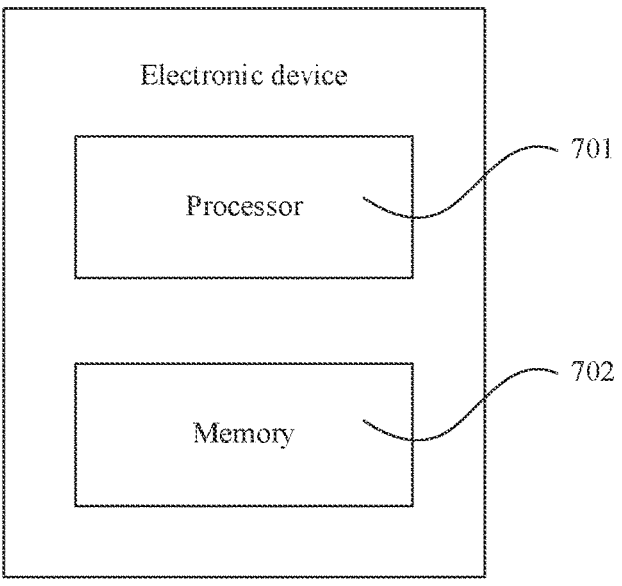
FIG. 7a is a schematic diagram of a structure of an electronic device according to an embodiment of this application.

This application further provides an electronic device. The electronic device may be the slave device or the master device. FIG. 7a is a schematic diagram of a structure of an electronic device according to an embodiment of this application. As shown in FIG. 7a, the electronic device may include a processor 701 and a memory 702. The memory 702 is configured to store at least one piece of instruction. When the instruction is loaded and executed by the processor 701, any one of the time synchronization operations provided in this application is implemented.

Figure 7B:
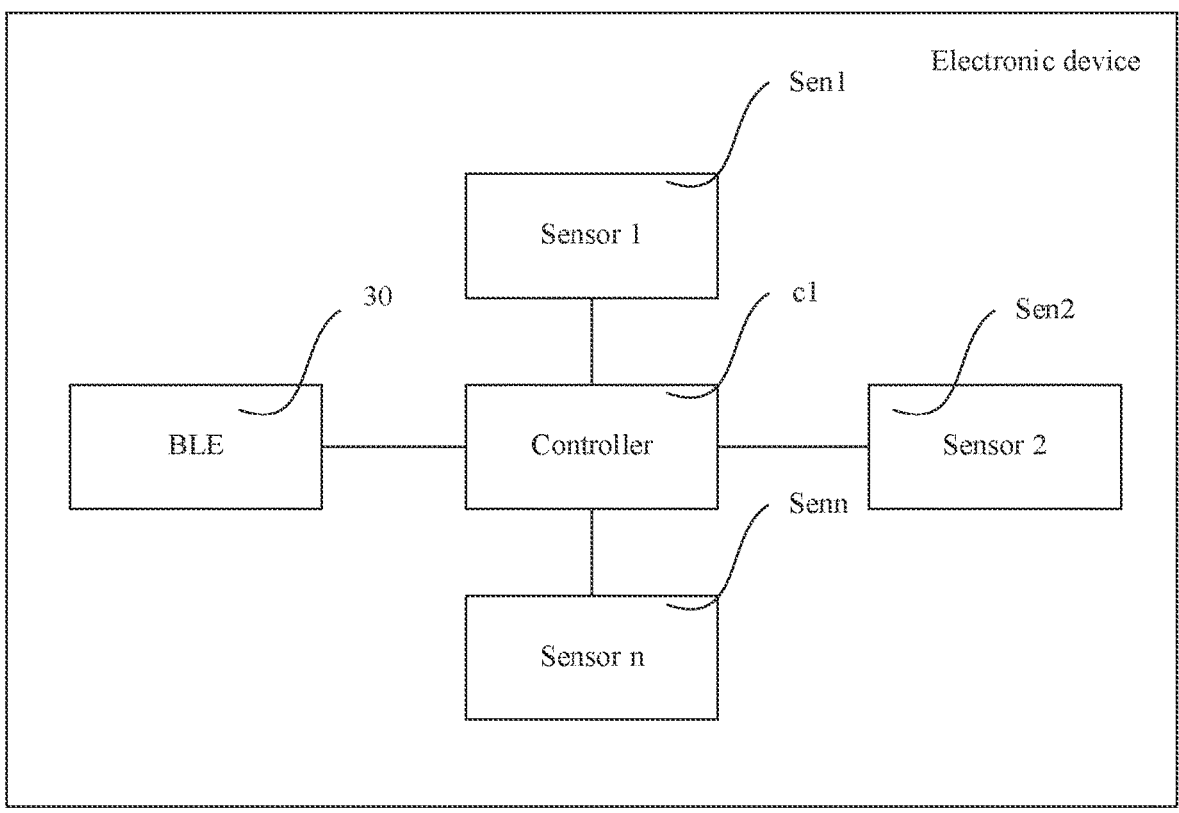
FIG. 7b is a schematic diagram of a structure of an electronic device according to another embodiment of this application.

In a possible implementation, another embodiment of this application provides an electronic device shown in FIG. 7b. The electronic device may be the slave device or the master device. As shown in FIG. 7b, the electronic device may include a BLE Bluetooth module 30, a controller c1, and a plurality of sensors Sen1 to Senn. The processor 701 and the memory 702 in the embodiment shown in FIG. 7a are encapsulated together to form the controller c1 in the embodiment shown in FIG. 7b. In addition, the slave device shown in FIG. 7b may communicate with the master device shown in FIG. 7b through the BLE Bluetooth module 30, to implement any one of the time synchronization operations provided in this application.

In an embodiment in which both the master device and the slave device are smart wearable devices, the smart wearable device has a plurality of sensors. For example, a smart watch or a bracelet includes an IMU (Inertial Measurement Unit) sensor and a PPG (photoplethysmography) sensor. The IMU sensor may be configured to measure a motion state of a human body, and the PPG sensor may be configured to measure a heart rate of the human body. The sensor is generally connected to the controller through a digital interface (to receive instructions of the controller, and transmit configuration data, sampled data, status information, and the like to the controller). The digital interface is generally a low-speed serial interface (such as an SPI or I2C). A micro controller is generally integrated in a sensor to configure and control the sensor. Generally, the sensor may use a built-in clock signal or an external clock signal, and the external clock signal is provided by a controller or a clock on a mainboard of the smart wearable device.

Figure 8:
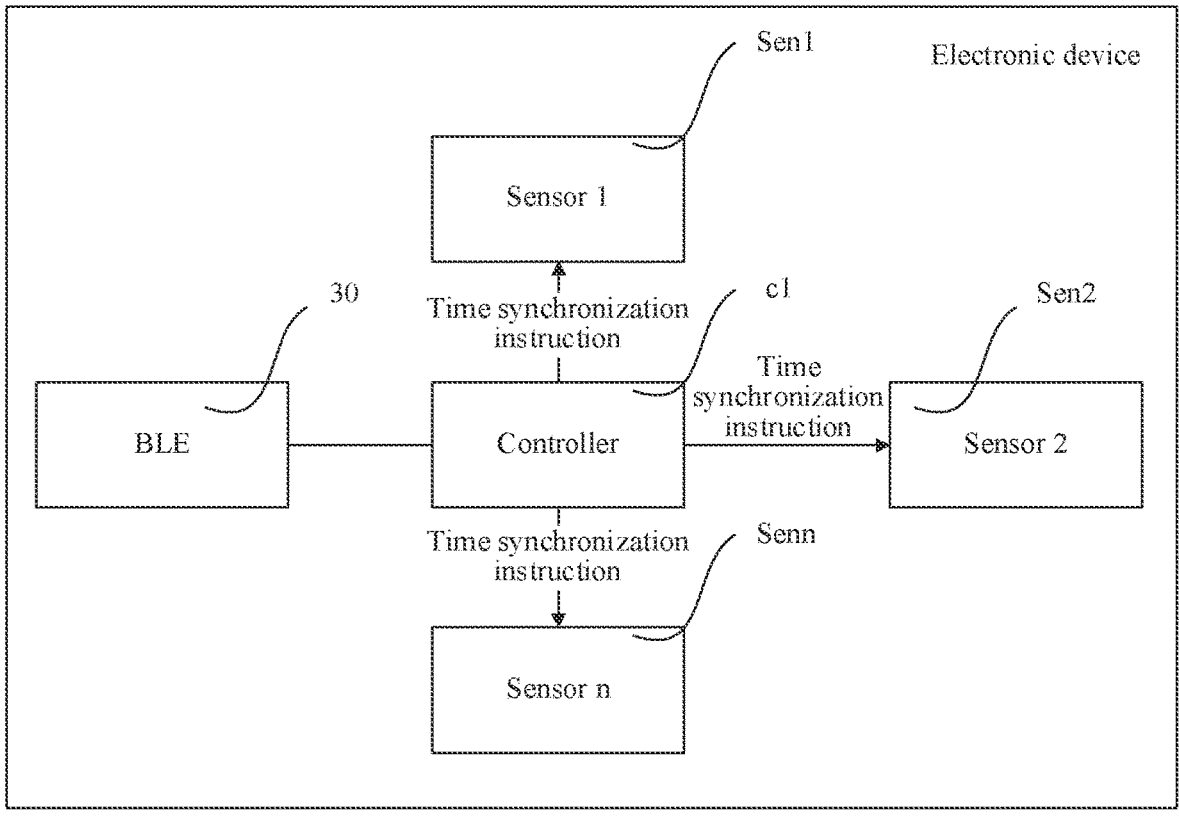
FIG. 8 is a schematic diagram of information transmission in a slave device according to this application.

Because a clock frequency of each sensor may be different, a sampling time of each sensor may be different, and a delay of an internal signal link of the sensor may be different, including a delay of an analog front end (Analog Front End, AFE). Currently, sampled data of the plurality of sensors not aligned in terms of time. As a result, when joint data processing is performed, a data alignment problem exists, or a result obtained by performing joint data processing is greatly different from an actual result. To resolve a problem of time synchronization of the sampled data of the plurality of sensors in the wearable device, the following solutions may be adopted:

Solution 1: Time synchronization information is transmitted through a separate pin, as shown in FIG. 8.

Specifically, a time synchronization pin is added to an interface between the sensors Sen1 to Senn and the controller c1, and the controller c1 periodically sends the time synchronization information to the sensors Sen1 to Senn. A time synchronization signal may be one or more pulse signals, a level signal, or the like.

The sensors Sen1 to Senn may sample data in two manners. In a first manner, an internal counter is reset each time the time synchronization signal is received. The internal counter is configured to perform frequency division on an internal clock or an external clock. The frequency-divided signal is used as a sampling clock of the sensors Sen1 to Senn, and the sensors Sen1 to Senn perform sampling based on the sampling clock. In a second manner, the sensors Sen1 to Senn perform sampling based on an internal clock or an external clock. When the time synchronization information is received, a time delay is recorded during current sampling or next sampling (for example, a quantity of internal or external clock cycles delayed by the current sampling or the next sampling relative to the time synchronization information is recorded). The current sampling indicates that before the sensors Sen1 to Senn end sampling, the slave device executes a time synchronization operation based on information sent by the master device.

When the sensors Sen1 to Senn upload data to the controller c1, the sampled data may be identified in two manners. In a first manner, a bit may be added to each piece of sampled data, to identify whether the sampled data is a first piece of sampled data or a latest piece of sampled data after the time synchronization information is received. In a second manner, when the sampled data is transmitted, data of one or more bytes is additionally transmitted, to identify which piece of data (for example, an $N^{th}$ piece) in the transmitted data is a first piece of sampled data or a latest piece of sampled data after the time synchronization information is received. Optionally, sampling offset transmitted to the controller c1 (an offset time of the sampling moment relative to the first piece of sampled data or the latest piece of sampled data when the time synchronization information is received, or an offset time of the sampling moment+a delay time of a signal path of the AFE relative to the first piece of sampled data or the latest piece of sampled data when the time synchronization information is received).

Solution 2: Time synchronization information is sent through a signal cable of a serial communication interface.

For a serial peripheral interface (SPI, Serial Peripheral Interface), the time synchronization information may be transmitted by multiplexing any signal or a combination of the following signals: a chip select (CS, chip select) signal, master input slave output (MISO, Master Input Slave Output) data, master output slave input (MOSI, Master Output Slave Input) data, and a clock (CLK, Clock) signal. For example, a plurality of narrow pulses can be continuously sent on the CS to transmit the time synchronization information, or when CS is disabled, the MISO, MOSI, and CLK are simultaneously pulled down to transmit the time synchronization information.

For the I2C interface, the time synchronization information can be transmitted by multiplexing any signal or a combination of a serial data line (SDA) signal and a serial clock line (SCL) signal. For example, N (N>=1) Start or Stop signals may be consecutively sent in a time period to transmit a time synchronization message. Alternatively, a Start and Stop signal is consecutively sent to transmit the time synchronization message.

A method for transmitting data by the sensors Sen1 to Senn to the controller c1 is the same as that in Solution 1.

Solution 3: Time synchronization information is transmitted through a control command. For example, a specified value is written to a specified address (for example, 0xaa is written to 0x6f). A start position of the time synchronization information may be specified to be a set position of the sent control command. For example, the I2C interface may be specified to be a position of a start signal for sending the control command or a position of R/W indication BIT.

A method for transmitting data by the sensors Sen1 to Senn to the controller c1 is the same as that in Solution 1.

This application further provides a sports and health monitoring system. The system may be configured to obtain information of high-precision comprehensive motion posture and/or health assessment of a user. The system includes one master device and one or more slave devices. A structure of the system may be shown in FIG. 1. In a possible implementation, the slave device in the system may be a smart wearable device, and the slave device may be a smart phone. As shown in FIG. 1, the system may include a smart phone M1 used as a master device, and smart wearable devices S1, S2, S3, and S4 used as slave devices. In the system, the master device is not limited to a smart phone, and may be another intelligent mobile terminal. For example, both the master device and the slave device are intelligent wearable devices.

Figure 9:
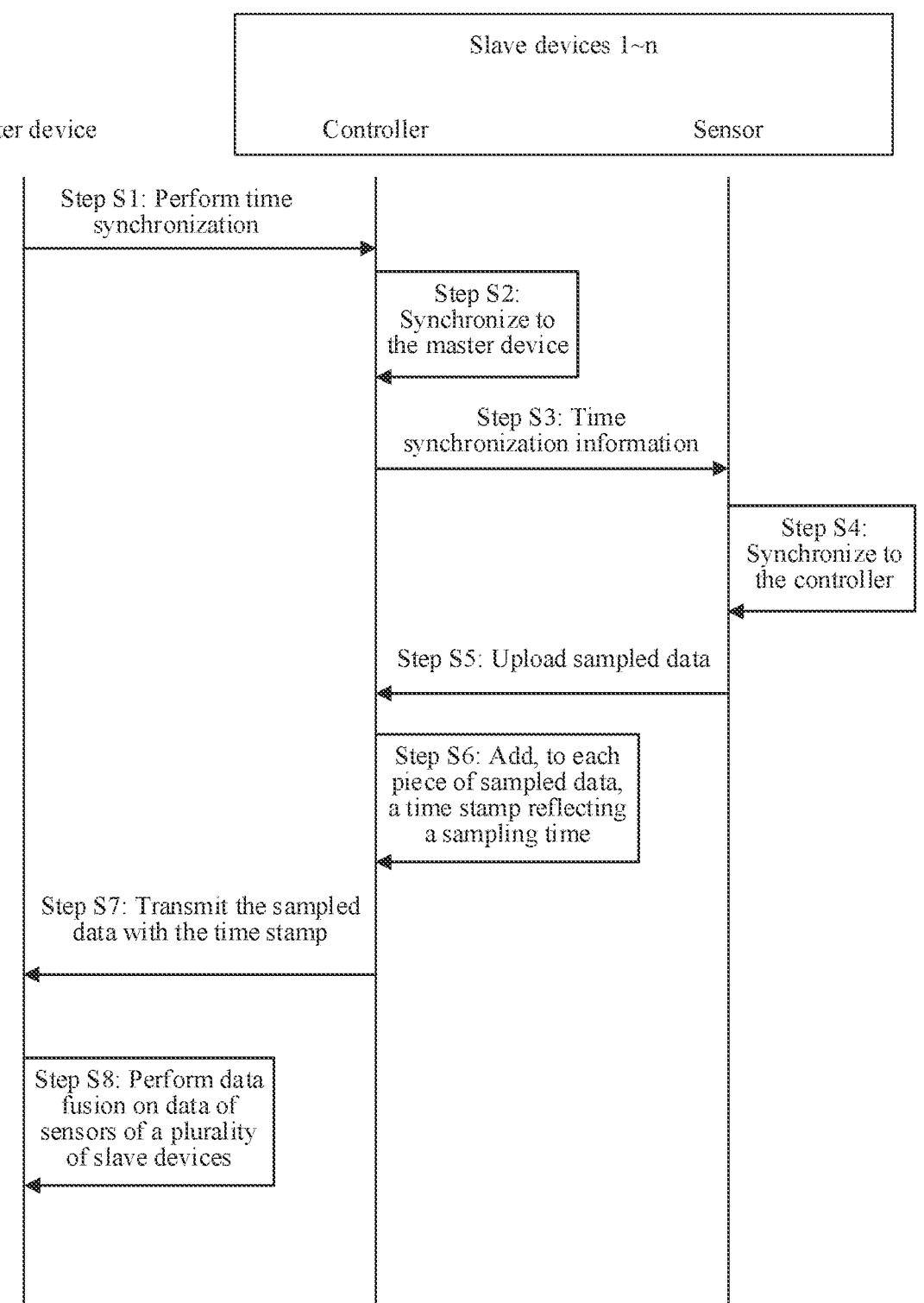
FIG. 9 is a schematic diagram of signaling about sampling control in a sports and health monitoring system according to this application.

FIG. 9 is a schematic diagram of signaling about sampling control in a sports and health monitoring system according to an embodiment of this application. As shown in FIG. 9, the sports and health monitoring system includes one master device and a plurality of slave devices, and completes data sampling, data uploading, and data fusion processing by performing the following steps:

Step S1: The master device sends a Bluetooth packet carrying time synchronization information to the slave device.

Step S2: The slave device performs time synchronization with the master device based on the received time synchronization information.

Step S3: The controller c1 sends the time synchronization information to one or more sensors Sen1 to Senn.

Step S4: The sensors Sen1 to Senn adjust internal clocks to achieve time synchronization with the controller.

Step S5: Sampling is performed based on the internal clock, and sampled data is uploaded to the controller c1.

Step S6: A time stamp is added to the sampled data based on a sampling time of the sampled data.

Step S7: The sampled data with the time stamp is transmitted to the master device.

Step S8: Data fusion processing is performed on sampled data (sensor data with a time stamp) sent by the plurality of sensors Sen1 to Senn.

Details of steps S1 to S8 are described below:

Time synchronization between the master and slave devices may be performed in steps S1 to S2 according to any one of the time synchronization manners in Embodiment 1, Embodiment 2, or Embodiment 3. The time synchronization procedure is not described herein again.

The following describes an operation process (steps S3 to S8) of performing corresponding data exchange between the master device and the slave device after time synchronization between the master device and the slave device is completed.

Specifically, synchronization is performed between the master device (Master) and one or more slave devices (Slave) by using a BLE time synchronization method. The slave device may implement time synchronization with the master device based on the time synchronization operation (for example, any one of Embodiment 1 to Embodiment 3) provided in this application, and may periodically perform the time synchronization operation.

The controller c1 in the slave device periodically transmits a time synchronization message to the sensors Sen1 to Senn. The sensors synchronize times of the sensors to the controller based on the time synchronization message, and perform sampling based on an internal clock on which time synchronization is performed. Specifically, after receiving the time synchronization message, the sensors Sen1 to Senn are configured to reset a frequency division counter of a sampled clock, or record a piece of sampling data or a latest sampling data annotation after the time synchronization message is received, and optionally record a sampling time offset of one sampling or a latest sampling relative to the time synchronization message after the time synchronization message is received.

The sensors Sen1 to Senn mark a time for the sampled data (for example, may mark a sampling data point when the time synchronization message is received), and transmit the marked data to the controller c1.

The controller c1 adds a time stamp to the sampled data of the sensors. For example, it is assumed that there are 100 pieces of data in a time period [T, T+10 seconds], and a sampling rate is 10 Hz. In this case, a start time T or an end time T+10 seconds of the 100 pieces of data may be used as a time stamp and added to data to be transmitted to the master device. The controller c1 of the slave device transfers the data to which the time stamp is added to the master device.

The master device performs data fusion processing based on the sampled data that is uploaded by the plurality of slave devices and that carries time stamp information obtained after time synchronization. For example, based on data uploaded by wearable devices on a hand and a foot, fusion processing is performed to calculate a current limb motion state or a limb coordination degree of the user.

Based on time synchronization between the master device and slave device by using the time synchronization operation provided in this application, multi-point synchronous detection performed by a plurality of sensors of a plurality of wearable devices can meet a requirement of a common scene or a high-speed sports scene.

It may be understood that, an application may be an application (nativeApp) installed on a terminal, or may be a web application (webApp) of a browser on the terminal. This is not limited in this application.

A person skilled in the art may clearly understood that, for the purpose of convenient and brief description, for specific working processes of the foregoing system, apparatus, and unit, refer to the corresponding processes in the method embodiments, and details are not described herein again.

In the several embodiments provided in the present invention, it is to be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer apparatus (which may be a personal computer, a server, a network apparatus, or the like) or a processor (Processor) to perform some of the steps of the methods described in embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely preferred embodiments of the present invention, but are not intended to limit the present invention. Any modification, equivalent replacement, or improvement made within the spirit and principle of the present invention should fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A first electronic device, comprising:
a memory configured to store instructions; and
a processor coupled to the memory and configured to:
obtain, from a second electronic device, a first BLUETOOTH packet carrying first time stamp information, wherein the first time stamp information indicates a first sending moment ($t_1$) of the first BLUETOOTH packet, and wherein the first time stamp information is a field in a protocol data unit of a BLUETOOTH physical frame in the first BLUETOOTH packet;
send, to the second electronic device, a second BLUETOOTH packet carrying second time stamp information, wherein the second time stamp information indicates a second sending moment ($t_2$) of the second BLUETOOTH packet, and wherein $t_2$ is a sending moment of a first bit of an access address in the second BLUETOOTH packet;
obtain, from the second electronic device, a third BLUETOOTH packet carrying third time stamp information, wherein the third time stamp information indicates an average unidirectional transmission delay between the first electronic device and the second electronic device; and
correct a local time based on the first time stamp information and the average unidirectional transmission delay,
wherein the first electronic device a smart wearable device, and wherein the second electronic device is a mobile device.

2. The first electronic device of claim 1, wherein the field comprises:
a first field that is a time stamp indication indicating that the BLUETOOTH physical frame carries a time stamp; and
a second field that is the time stamp comprising $t_1$.

3. The first electronic device of claim 1, wherein the processor is further configured to set $t_1$ as a current local time of the first electronic device.

4. The first electronic device of claim 1, wherein the third time stamp information further comprises a receiving moment ($t_3$), and wherein the processor is further configured to:

determine a transmission delay according to $t_1$, $t_2$, and $t_3$; and further correct the local time based on the transmission delay.

5. The first electronic device of claim 1, wherein the processor is further configured to:

determine a receiving moment ($t_4$) of the first BLUETOOTH packet;

send, to the second electronic device, a fourth BLUETOOTH packet comprising $t_4$ and a third sending moment ($t_5$) of the fourth BLUETOOTH packet;

receive, from the second electronic device, a fifth BLUETOOTH packet comprising a transmission delay and a frequency offset time difference; and further correct the local time based on the transmission delay and the frequency offset time difference.

6. The first electronic device of claim 1, wherein the processor is further configured to:

determine a first receiving moment ($t_4$) of the first BLUETOOTH packet;

send, to the second electronic device, a fourth BLUETOOTH packet comprising $t_4$ and a third sending moment ($t_5$);

receive, from the second electronic device, a fifth BLUETOOTH packet comprising a second receiving moment ($t_6$);

determine a transmission delay and a frequency offset time difference based on $t_1$, $t_4$, $t_5$, and $t_6$; and further correct the local time based on the transmission delay and the frequency offset time difference.

7. The first electronic device of claim 1, wherein the processor is further configured to correct the local time based on $t_1$ and a first processing time period.

8. A second electronic device comprising:

a memory configured to store instructions; and a processor coupled to the memory and configured to:

obtain clock information of the second electronic device;

determine a pre-start sending moment of a first BLUETOOTH packet based on the clock information;

determine a sending moment of a first bit of an access address in the first BLUETOOTH packet based on the pre-start sending moment;

set the sending moment as a sending moment ($t_1$) of the first BLUETOOTH packet;

send the first BLUETOOTH packet to a first electronic device at the pre-start sending moment, wherein the first BLUETOOTH packet carries first time stamp information, wherein the first time stamp information indicates $t_1$, and wherein the first time stamp information is a field in a protocol data unit of a BLUETOOTH physical frame in the first BLUETOOTH packet;

obtain, from the first electronic device, a second BLUETOOTH packet carrying second time stamp information, wherein the second time stamp information indicates a sending moment ($t_2$) of the second BLUETOOTH packet;

determine, based on the clock information, a receiving moment ($t_3$) at which the second BLUETOOTH packet is received;

calculate an average unidirectional transmission delay between the second electronic device and the first electronic device based on $t_1$, $t_2$, and $t_3$, and send, to the first electronic device, a third BLUETOOTH packet carrying third time stamp information, wherein the third time stamp information indicates the average unidirectional transmission delay, wherein the first electronic device is a smart wearable device, and wherein the second electronic device is a mobile device.

9. The second electronic device of claim 8, wherein the field comprises:

a first field that is a time stamp indication, wherein the time stamp indication indicates that the BLUETOOTH physical frame carries a time stamp; and a second field that is the time stamp, wherein the time stamp comprises $t_1$.

10. The second electronic device of claim 8, wherein the processor is further configured to calculate the average unidirectional transmission delay using a formula, wherein the formula is $$T_1 = \frac{t_3 - t_1 - (t_2 - t_1)}{2},$$

and wherein $T_1$ represents the average unidirectional transmission delay.

11. The second electronic device of claim 8, wherein the processor is further configured to:

receive, from the first electronic device, a fourth BLUETOOTH packet carrying fourth time stamp information, wherein the fourth time stamp information indicates a sending moment ($t_2$) of the fourth BLUETOOTH packet, and wherein $t_2$ is a sending moment of a first bit of an access address in the fourth BLUETOOTH packet; and send, from the first electronic device, a third BLUETOOTH packet carrying third time stamp information, wherein the third time stamp information comprises a receiving moment ($t_3$).

12. The second electronic device of claim 8, wherein the processor is further configured to:

receive, from the first electronic device, a fourth BLUETOOTH packet comprising a receiving moment ($t_4$) of the first BLUETOOTH packet and a sending moment ($t_5$) of the fourth BLUETOOTH packet;

determine a transmission delay and a frequency offset time difference based on $t_1$, $t_4$, and $t_5$; and send, to the first electronic device, a third BLUETOOTH packet comprising the transmission delay and the frequency offset time difference.

13. A method comprising:

obtaining, by a first electronic device, a first BLUETOOTH packet from a second electronic device, wherein the first BLUETOOTH packet carries first time stamp information, wherein the first time stamp information indicates a first sending moment ($t_1$) of the first BLUETOOTH packet, and wherein the first time stamp information is a field in a protocol data unit of a BLUETOOTH physical frame in the first BLUETOOTH packet;

sending, by the first electronic device, a second BLUETOOTH packet to the second electronic device, wherein the second BLUETOOTH packet carries second time stamp information, wherein the second time stamp information indicates a second sending moment ($t_2$) of the second BLUETOOTH packet, and wherein $t_2$ is a sending moment of a first bit of an access address in the second BLUETOOTH packet;

obtaining, by the first electronic device, a third BLUETOOTH packet from the second electronic device, wherein the third BLUETOOTH packet carries third time stamp information, and wherein the third time stamp information indicates an average unidirectional transmission delay between the first electronic device and the second electronic device;

correcting, by the first electronic device, a local time of the first electronic device based on the first time stamp information and the average unidirectional transmission delay;

obtaining, by the second electronic device before sending the first BLUETOOTH packet to the first electronic device, clock information of the second electronic device;

determining, by the second electronic device, a pre-start sending moment of the first BLUETOOTH packet based on the clock information;

determining, by the second electronic device, a sending moment of a first bit of an access address in the first BLUETOOTH packet based on the pre-start sending moment; and setting, by the second electronic device, the sending moment of the first bit as $t_1$, wherein the first electronic device is a smart wearable device, and wherein the second electronic device is a mobile device.

14. The method of claim 13, wherein the field comprises:

a first field that is a time stamp indication indicating that the BLUETOOTH physical frame carries a time stamp; and a second field that is the time stamp comprising $t_1$.

15. The method of claim 13, further comprising setting, by the first electronic device, $t_1$ as a current local time of the first electronic device.

16. The method of claim 13, further comprising:

sending, by the first electronic device, a fourth BLUETOOTH packet to the second electronic device, wherein the fourth BLUETOOTH packet carries fourth time stamp information, wherein the fourth time stamp information indicates a second sending moment ($t_2$) of the fourth BLUETOOTH packet, and wherein $t_2$ is a sending moment of a first bit of an access address in the fourth BLUETOOTH packet;

obtaining, by the first electronic device, a fifth BLUETOOTH packet from the second electronic device, wherein the fifth BLUETOOTH packet carries fifth time stamp information, and wherein the fifth time stamp information comprises a receiving moment ($t_3$);

determining, by the first electronic device, a transmission delay according to $t_1$, $t_2$, and $t_3$; and further correcting, by the first electronic device, the local time based on the transmission delay.

17. The method of claim 13, further comprising:

determining, by the first electronic device, a receiving moment ($t_4$) of the first BLUETOOTH packet;

sending, by the first electronic device, a fourth BLUETOOTH packet to the second electronic device, wherein the fourth BLUETOOTH packet comprises $t_4$ and a second sending moment ($t_5$) of the fourth BLUETOOTH packet;

receiving, by the first electronic device, a fifth BLUETOOTH packet from the second electronic device, wherein the fifth BLUETOOTH packet comprises a transmission delay and a frequency offset time difference; and further correcting, by the first electronic device, the local time based on the transmission delay and the frequency offset time difference.

* * * * *